United States Patent [19]

Dobras

[11] 3,784,792

[45] Jan. 8, 1974

[54] CODED RECORD AND METHODS OF AND APPARATUS FOR ENCODING AND DECODING RECORDS

[75] Inventor: Bruce W. Dobras, Dayton, Ohio

[73] Assignee: Monarch Marking Systems, Inc., Dayton, Ohio

[22] Filed: Mar. 29, 1972

[21] Appl. No.: 239,168

[52] U.S. Cl. .................... 235/61.11 E, 340/146.3 Z
[51] Int. Cl. .............................................. G06k 7/10
[58] Field of Search .............. 235/61.11 R, 61.11 E; 340/146.3 K, 146.3 Z

[56] References Cited

UNITED STATES PATENTS

| | | | |
|---|---|---|---|
| 3,688,260 | 8/1972 | Jensen et al. | 340/146.1 R |
| 3,543,007 | 11/1970 | Brinker et al. | 340/146.3 K |
| 3,543,241 | 11/1970 | Leuck | 340/146.3 K |

*Primary Examiner*—Maynard R. Wilbur
*Assistant Examiner*—Joseph M. Thesz, Jr.
*Attorney*—Richard D. Mason et al.

[57] ABSTRACT

A novel record with alternate width modulated bars and spaces is decoded by comparing the width of each bar or space with a pair of reference values based on the product and quotient of a constant and the width of another bar or space to establish bit value. When the width value is greater or less than the reference value, the bit value is established. When the width values lie between the reference values, a state of equality is established which is resolved into a bit value by reference to the results of a prior or subsequent comparison. A system embodying the method includes storage means for storing width values, reference registers for establishing successive different sets of product and quotient reference values, and comparators controlled by the stored width and reference values for establishing the greater and less than and equality status conditions. In one embodiment, a shift register and logic circuits controlled by the status conditions provide dynamic interpretation of the status conditions into code bits as the character is read. In another embodiment, the status conditions are stored and then translated into code bits after a complete character has been read. In one code set, each character code of seven bits formed by four bars and three spaces uses five bits to define the character and the remaining two bits to provide separate bar and space parity bits. This and the fact that only one space "1" and one bar "1" are included in a proper code results in a code with an extremely low expected rate of undetected error. The system also includes separate parity check circuits for the decoded bar and space bits.

20 Claims, 9 Drawing Figures

CODED RECORD AND METHODS OF AND APPARATUS FOR ENCODING AND DECODING RECORDS

This invention relates to coded records and methods of and apparatus for encoding and decoding these records, and, more particularly, to improvements in such records, methods, and apparatus using width modulated code areas.

The need for acquiring data at, for example, a point of sale is well recognized, and many attempts have been made in the past to provide records, tags, or labels and reading and interpreting systems that are capable of being used in retail stores at the point of sale and for inventory. In this application, the records must be easily and economically made and must be such that, for example, handling by customers does not deface the coding or render the code incapable of accurate reading. The record should be such that it can be read either by a portable manually manipulated reader or a stationary machine reader of low cost, and the code used should be easily checked for errors with low error probability. Further, when the record or label is to be read by a manual reader, it should be such that the record interpretation is as independent of speed of reading as is possible.

Prior approaches to this problem have used sequential areas or bars of different light reflecting characteristics in which bit value is determined by color. These records are expensive to produce and require somewhat more elaborate reading systems than desirable. Other techniques provide codes in bar or stylized character form with magnetic or light reflecting recordings in which absolute values in a dimension such as width are assigned to the different binary weights or values. These codes can be read serially or in parallel. The parallel codes require plural transducers which cannot be easily accommodated in a portable reader, and the magnetic recordings are also not easily read with manual or portable readers. The sequential bars of varying widths are easily read using a single transducer in a portable unit but generally use level detection equipment or individual width timers in the interpreting system which are not easily compensated for variations in the manually controlled speed of relative movement between the reader and the record. These bar codes are easily printed on paper or card stock by inexpensive equipment, and a system shown in a copending application Ser. No. 199,231, filed Nov. 16, 1971 compares widths of pairs of bars or pairs of spaces to reduce errors arising from printing ink changes.

Accordingly, one object of the present invention is to provide a new and improved method of and apparatus for interpreting a coded record.

Another object is to provide a coded record and code capable of interpretation with a low rate of undetected error.

Another object is to provide a new and improved method of interpreting a coded record in which the size of each code area is assigned a binary value and in which each given area is decoded by comparing its size with two reference values based on multiplying and dividing another code area size by a constant.

Another object is to provide a method of and apparatus for interpreting or translating records binary coded in areas of different widths by comparing the widths of individual areas with two reference values established during translating by multiplying and dividing different area widths by a constant. Decoding is accomplished by establishing a greater than, less than, or equality relation between each set of reference values and different code area size values.

A further object is to provide an apparatus for reading records wherein each character is encoded by a combination of areas in two ranges of wide and narrow widths and which includes registers for storing scanned width values, a pair of registers in which are sequentially stored the product and quotient of a constant and the width of each area, and a means for decoding code values by determining the relation between each stored width and the two reference values based on another area.

Another object is to provide a method of and system for decoding area size coded records in which a determination that a code area is greater or less than a reference value results in immediate code value establishment while an equality determination defers code value establishment and makes it dependent on a subsequent or prior greater or less than determination.

A further object is to provide a width modulated bar and space coded record and parity check means for separately checking bar and space parity.

In accordance with these and many other objects, an embodiment of the present invention comprises a record, tag, or label made, for example, of a member having a light reflective surface on which are recorded a plurality of non-reflecting bars. The widths of the non-reflecting bars and the reflecting spaces disposed between and defined by the nonreflecting bars are modulated in width so that a binary "1" is represented by one width, i.e., a value in a range of wide widths, and a binary "0" is represented by another different width, i.e., a value in a range of narrow widths. In one embodiment, each character is represented by a seven bit binary code formed by four black or nonreflective bars and the three white bars or spaces separating the four black bars. Five bits define the character, and the remaining two bits are separate parity bits for space and bar encoded data. A low error code of this type uses only one space encoded 1 and one bar encoded 1.

These records can be easily produced using nothing more than conventional paper or card stock and simple coding elements either individual or in sequence for applying ink or other nonreflective material to the record. The record making apparatus can be such as to sequentially or concurrently record a plural character message, each character comprising a plurality of bits. The message can be preceded and followed by start or control codes coded in the same manner as the characters of the message.

This record is interpreted by a manually held light pen or reader including, for example, a light source for directing light onto the record and a light responsive element providing a varying output in dependence on the quantity of reflected light received from the record, although this reading assembly could as well be incorporated into a stationary record reading mechanism. The record is read by producing relative movement between the reader and the record requiring only that the reader pass across the entire coded message along a line intersecting all of the bars and spaces. The analog signal developed by the photoresponsive unit in the reader is digitized and used to sequentially gate clock signals into a series of counting registers to sequentially store the values of the sizes of different bars and spaces. Through the use of clock signal dividers gated by the digitized signal, the products and quotients of a constant and each of the bar and space widths are stored in sequence in a pair of reference value registers. The reference values stored for any given bar (space) are compared with the value of the size of a preceding bar (space) to determine whether the preceding bar (space) is greater than, less than, or approximately equal to the given bar (space).

The results of the comparison control logic circuits to store binary 0s and 1s in a storage unit when a greater than or less than relation or status is found. A determination of a condition of equality for an area defers the establishment of a binary value and makes it dependent on a prior or a subsequent greater than or less than relation. In one embodiment, the storage means is a plural stage shift register having an input stage and intermediate stages in which immediately and delayed determined bits are entered. In another embodiment, a pair of shift registers store the comparison results, which shift registers control a read-only-memory (ROM) that decodes the comparison results into a character.

To increase the probability that only correctly decoded characters are provided, the system includes a parity checking circuit that independently checks for parity the decoded space and bar binary bits. In the seven bit character codes used in the present system and with the permissible character codes selected to include only those containing two binary 1 bits (a 2–7 character code), the probability of error can be reduced to 0.00001 percent. Comparable results can be obtained using a seven bit code with three binary 1s (a 3–7 character code).

By using as reference values for comparison with the stored bit widths values based on arithmetic operations on a code area measured during the reading of the stored widths, variations in reading speed, for instance, cause like and proportionate changes in the reference values and the code area widths, and velocity errors are reduced or eliminated.

Many other objects and advantages of the present invention will become apparent from considering the following detailed description in conjunction with the drawings in which.

Figure 1:
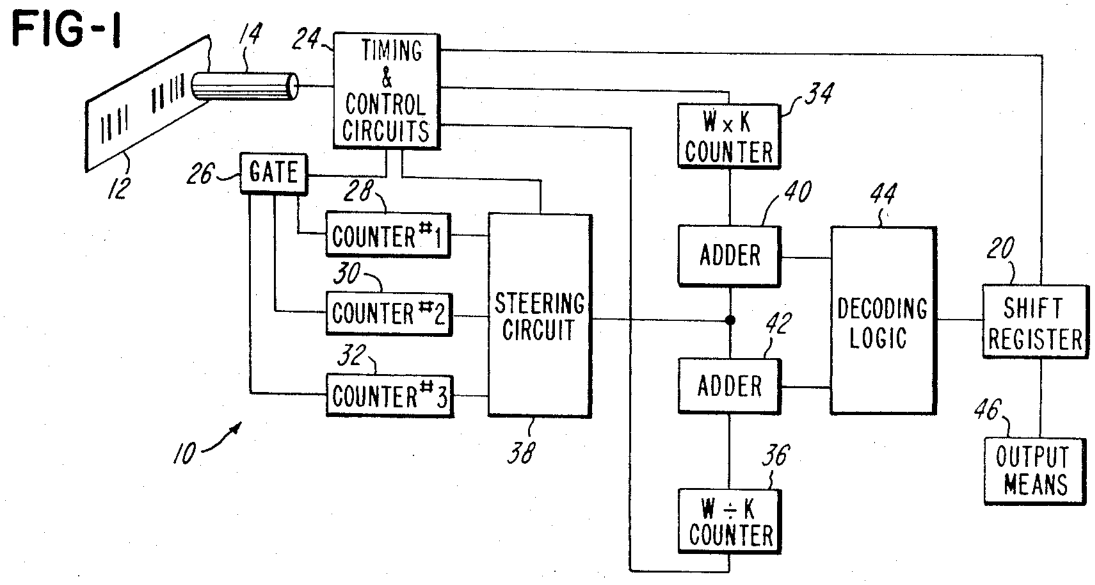
FIG. 1 illustrates a record in conjunction with a reader and interpreting circuit which embodies the present invention and which is shown in simplified block diagram form.

Referring now more specifically to FIG. 1 of the drawings, therein is illustrated a system indicated generally as 10 for interpreting a bar coded record 12. In the coding used on the record 12, the widths of the bars and spaces vary in accordance with the bit value to be encoded so that when relative movement is produced between the record 12 and an optical reader 14, the apparent width varies in dependence on the speed of relative movement. In accordance with the present invention, the system 10 includes means for establishing reference values during the actual scanning of the record 12 by the reader 14 against which the widths of the bars and spaces can be compared so that the true binary significance of the encoded data can be accurately determined substantially independent of reading speed and without requiring additional indicia over and above the usual bar code on the record 12. Codes used in the present invention are such that undetectable errors are almost impossible.

Figure 2:
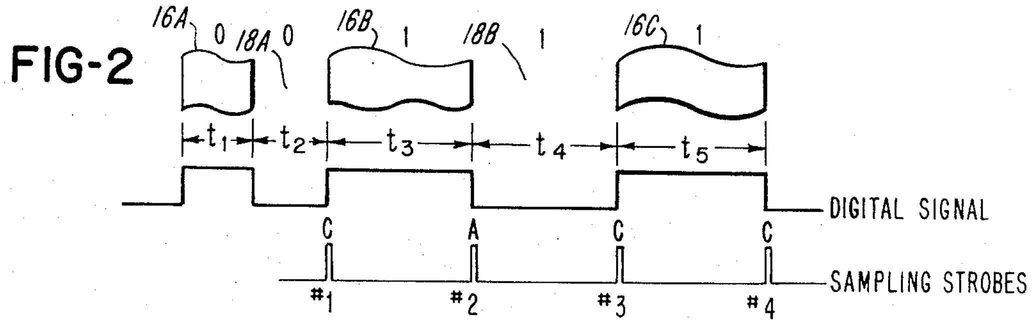
FIG. 2 is a schematic illustration of one three bar character code in a set of codes capable of interpretation according to the present invention shown in conjunction with certain signal waveforms used in decoding the character code.

The code used in preparing the record 12 can be one of a general type known in the art, and FIG. 2 of the drawings illustrates one character code 00111 that can be used in carrying out the present invention. The illustrated code is a five bit code whose bits are defined by three bars or areas 16A, 16B, and 16C of one characteristic and two intervening bars or spaces 18A and 18B of a different characteristic. In a preferred embodiment, the bars 16A–16C are formed by printing a substantially nonreflective material, such as black ink, on the reflective surface of the record 12 so that the areas, bars, or spaces 18A and 18B comprise the light reflective surface of the record. The different characteristics of the bars 16A–16C and 18A and 18B could also be defined by the use of different materials, such as the presence or absence of magnetic material or materials of sufficiently different light reflecting characteristics.

The encoding technique used in the code illustrated in FIG. 2 is to assign a wide width to the bars or areas 16, 18 to represent a binary 1 and to assign a narrow width to the bar or area 16, 18 to represent a binary 0. The relative size of the wide and narrow width should be optimized to insure adequate differentiation on interpretation, and in general this is accomplished by maximizing the difference between the wide and narrow widths within the constraints that the narrow bar must be large enough to insure a proper width value entry on interpretation, and the wide width must not be so large as to provide an overflow condition on entering a width value. The wide and narrow widths can extend over a range of values limited by the factor noted above, printing tolerances, and factors noted below. Another factor to be considered is that an increase in the differentiation between widths generally results in an accompanying loss of bit density or packing on the record, while a reduction in width difference can be used to increase bit density. In one embodiment of the present invention, the narrow width representing a binary 0 was selected to be in the range of 6 to 15 mils, nominal, while the wide width was set to fall within the range of 17 to 34 mils, nominal.

A further factor to be considered with regard to the selection of widths for the bars is the printing tolerances which must be maintained to insure accurate record interpretation. Using the values set forth above, accurate differentiation with single bit parity error detection can be obtained with width tolerances of − 2 to + 5 mils. A change in bar size of from − 14 to + 14 mils can result in an undetected error using a single bit parity check.

To illustrate one possible width coding technique using true binary, one code in a code set assigned, for example, to the numerical character three with an odd parity check on binary 1s (FIG. 2) is 00111. Considered from left to right, these binary bits represent the binary weights 8, 4, 2, 1, and parity, respectively. The binary values 1 in the third and fourth bit positions are denoted by the wide widths assigned to the bar 16B and the space 18B. The binary values 0 in the first and second bit positions are represented by the narrow widths assigned to the black bar 16A and the white bar 18A. The bar 16C is assigned a wide width to provide a parity bit for the odd parity check. Other codes in this set including the remaining character codes and possible control codes are shown in the following table together with the bar and space width assignments, expressed in mils:

| Character | 16A | 18A | 16B | 18B | 16C |
|---|---|---|---|---|---|
| 00001 | 11.4 | 14.0 | 11.4 | 14.0 | 29.2 |
| 00010 | 12.2 | 15.3 | 12.2 | 34.5 | 6 |
| 00100 | 11.4 | 14.0 | 29.2 | 14.0 | 11.4 |
| 00111 | 6 | 11.2 | 24.5 | 22.1 | 16.8 |
| 01000 | 6 | 34.5 | 12.2 | 15.3 | 12.2 |
| 01011 | 6 | 25.5 | 6 | 25.5 | 17.9 |
| 01101 | 6 | 22.8 | 20.6 | 9 | 20.6 |
| 01110 | 6 | 25.5 | 17.9 | 25.5 | 6 |
| 10000 | 29.2 | 14.0 | 11.4 | 14.0 | 11.4 |
| 10011 | 23.9 | 10.9 | 6 | 22.7 | 16.5 |
| 10101 | 20.6 | 9 | 20.6 | 9 | 20.6 |
| 10110 | 20.6 | 9 | 20.6 | 22.8 | 6 |
| 11001 | 16.5 | 22.7 | 6 | 10.9 | 23.9 |
| 11010 | 17.9 | 25.5 | 6 | 25.5 | 6 |
| 11100 | 16.8 | 22.1 | 24.5 | 11.2 | 6 |

When these codes are read in forward or reverse direction, the binary significance of the bars and spaces is unchanged, but the order of presentation of the character code is reversed. Certain additional codes used for start or stop codes can be provided which are distinct when read in forward or reverse direction. This permits reverse read codes to be changed in order to correct codes. Such an arrangement of start and stop codes is shown and described in a copending application Ser. No. 157,870, filed June 29, 1971, and assigned to the same assignee as the present application.

FIG. 2 of the drawings also illustrates, in addition to the fragmentary showing of one three bar character code, a digitized representative waveform resulting from the reading of this code by the reader 14 in which a high level signal represents a black bar 16 and a low level signal represents a white bar or space 18. In this digitized signal, the widths of the bars 16, 18 are represented by the time intervals $t_1 - t_5$. In accordance with the present invention, the binary significance or value to be attributed to the various widths signified by the times $t_1 - t_5$ is established in dependence on the relationship between the width of a given area or bar and the quotient and product of a constant $K$ and another area or bar, either adjacent or spaced therefrom where the constant $K$ is a number greater than one.

To illustrate the novel method of decoding the record 12 wherein the relationship of adjacent bars or areas is used, the algorithm for decoding can be stated as follows:

$$\text{Relation } A \text{ implies } t_{n-1}<t_n(1/K) \quad (1)$$

$$\text{Relation } B \text{ implies } t_{n-1}>t_n(K) \quad (2)$$

$$\text{Relation } C \text{ implies } t_n(K)>t_{n-1}>t_n(1/K) \quad (3)$$

In statement 1 the establishment of relation $A$ indicates that the binary significance of the width $t_{n-1}$ is a binary 0 because the width of the area $t_{n-1}$ is less than the quotient of the width of the following area and the constant $K$. In statement 2 the establishment of relation $B$ implies that the binary significance to be attributed to the width $t_{n-1}$ is a binary 1 because the width $t_{n-1}$ is greater than the product of the constant and the width of the adjacent area $t_n$. The establishment of relation $C$ in statement 3 implies that binary significance cannot be attributed. This is true because the width of the area or bar under examination $t_{n-1}$ is less than the product of the constant and the width $t_n$ of the adjacent area and greater than the quotient of the constant $K$ and the width $t_n$ of the adjacent area.

In a system for carrying out the method of decoding using the algorithm embodied in statements 1–3 above, the system includes a register for storing a value proportional to the time $t_1$ representing the width of the bar 16A as the record 12 is read. As the reader 14 then enters the first white bar or space 18A, a value corresponding to the width of this area $t_2$ is stored, and a pair of reference registers are provided with values representing the product and quotient of the constant K and the width $t_2$ of the bar 18A. When all of these values are in storage, the system develops a first sampling strobe signal (No.1) which enables logic circuits such as comparators to compare the value $t_1$ with a product and quotient reference values based on the width $t_2$. By reference to the statements 1–3, it will be seen that only statement 3 is satisfied because the value $t_1$ is less than the value of the product of $t_2$ and $K$ and greater than the value of the quotient of $t_2$ and $K$. This establishment of condition $C$ implies that binary significance cannot be attributed to the width $t_1$ at this time. A representation of the established condition or relation $C$ is stored.

The system then discards the width $t_1$ and stores both the width $t_3$ and the product and quotient of the constant $K$ and the width $t_3$. When the next sampling strobe (# 2) is developed by the system, the value $t_2$ is compared with the values based on the product and quotient of the constant $K$ and the width $t_3$. By reference to statements 1–3, condition $A$ is established because the width $t_2$ is less than the quotient of the constant $K$ and the width $t_3$. At this time, two options exist with regard to the translation or interpretation of the coded record. The logic circuit can be such as to assign binary significance to all three of the areas 16A, 18A, and 16B at this time, or the condition *A* can be stored until the completion of the scanning of the characters shown in FIG. 2, at which time binary significance can be assigned to each of the width modulated areas. Assuming that binary significance is to be established upon establishing the condition *A*, the establishment of this condition states that the width $t_2$ is less than the width $t_3$ so that the width $t_2$ is probably a binary 0 and the width $t_3$ is probably a binary 1. In view of the previously established condition *C* arising from the first comparison and since the width $t_2$ is a binary 0, the width $t_1$ is also probably a binary 0.

The system then establishes the product and quotient reference values for the width $t_4$ which are compared with the stored width $t_3$ on the third sampling pulse (# 3) resulting in the establishment of condition *C*. Using sequential decoding, the establishment of condition *C* does not establish binary significance and requires reference back to the next adjacent determinative condition, i.e., a relation *A* or *B*. Since the closest adjacent established condition is relation *A*, the relation *C* established on the third sampling strobe signal indicates that a binary 1 is to be assigned to width $t_4$. On the next or fourth sampling strobe signal (# 4), the product and quotient reference values based on the width $t_5$ are compared with the stored width $t_4$ to again result in the establishment of relation or condition *C*. In the sequential decoding arrangement, the establishment of this equality condition or relation C again requires reference back to the most recently established determinative condition, i.e., the relation *A* established on the second sampling strobe, with the result that a binary 1 significance is attributed to the width $t_5$. In this connection, it is noted that the width $t_5$ is never actually measured by the system and that the binary significance to be attributed to the bar 16C is established on the basis of the relation between the product and quotient reference values based on the width $t_5$ and the measured width of the preceding area $t_4$.

In the alternative method of interpreting a character code such as the illustrative code shown in FIG. 2, storage means are provided for storing representations of the sequentially established relation, i.e., CACC, and a translating means such as a read-only-memory (ROM) translates the pattern of sequentially established relation into binary code corresponding to the width modulated bars.

To facilitate an understanding of and the application of the interpreting method of the present invention based on prior statements 1–3, there is set forth below a set of correlative statements defining the binary implications of various sequences of the three relations defined in statements 1–3:

*A* followed by *C* implies 011. (4)

*C* followed by *A* implies 001. (5)

*B* followed by *C* implies 100. (6)

*C* followed by *B* implies 110. (7)

*A* followed by *B* implies 010. (8)

*B* followed by *A* implies 101. (9)

*C* followed by *C* followed by *A* implies 0001. (10)

*C* followed by *C* followed by *B* implies 1110. (11)

*A* followed by *C* followed by *C* implies 0111. (12)

*B* followed by *C* followed by *C* implies 1000. (13)

By reference to the statements above and FIG. 2 of the drawings, statement 5 defines the first three bits 001 formed by the bars 16A, 18A, and 16B of the representative code. Considered alternatively, the bits defined by the bars 18A, 16B, and 18B are established by statement 4. Considered from another viewpoint, the last four bits represented by bars 18A, 16B, 18B, and 16C, respectively, are defined by statement 12. By reference to statements 4–13, the relations established during the reading of a character can be examined in sequence or concurrently to determine the binary significance to be attributed to the various areas or bars of a character code set.

Under certain conditions involving printing tolerances and selection of extreme limiting values for widths, either broad or narrow, in the establishment of the character code set, it is possible that two other sequences of the relations *A* and *B* may be established which are set forth below in statements 14 and 15:

*A* followed by *A* implies 001. (14)

*B* followed by *B* implies 100. (15)

As an example, using the character code set in which, for example, a first 0 representing bar has a nominal printing width of 6 mils, a following first space has a nominal width of 11 mils also representing a binary 0, and the second bar representing a binary 1 has a nominal width of 24 mils, all in the ranges set forth above, it is possible that the comparator logic would interpret the successive widths of 6 mils, 11 mils, and 24 mils as a pair of successive *A* relations, rather than a *C* relation followed by an *A* relation. This condition is covered by statement 14 which implies that the binary significance is 001, the same as if the code had been interpreted as in statement 5 above. An opposite condition with respect to the relative widths of the successive areas would result in the sequential establishment of condition *B*'s which would be interpreted as 100 by statement 15 and would reach the same result as if interpreted in accordance with statement 6 above.

The decoding technique set forth above can be used with codes using a greater or lesser number of bars with the consequent change in the number of intervening white bars or spaces, and can also be used in interpreting codes in which the spaces are without significance and intelligence is width modulated in only the printed bars, and vice versa. By width modulating only printed bars and having bars either narrow or wide printed on uniform centers, the code is adaptable for use with high speed serial printers of the type used as computer output units. As an example, a *BCD* character with a parity bit can be encoded in five bars, and an error that cannot be detected by usual parity checking circuitry requires the inversion of both a narrow bar and a wide bar with a consequent reversal in binary significance of the encoded bit. As an example, using nine mil centers between bars and assigning narrow bars a nominal width of 6 mils and large bars a nominal width of 12 mils, each of the 15 character odd parity character set can be recorded in an 80 mil character width or 10 characters per inch. This type of code font can be recorded with a Model 104 printing unit manufactured by Monarch Marking Systems, Inc. of Dayton, Ohio.

Based on experience with three bar systems and conventional parity checking techniques, past operating experience has demonstrated that a one percent error rate can be anticipated.

As noted above, the primary source of undetected errors results from an inversion in the binary significance to be attributed to a width modulated area. In a record in which black or nonreflective bars are printed on reflective record material with either or both of the balck and white bars being modulated in width, the inversion in binary significance of a bar or area arises from printing smears which extend a black bar or width with a corresponding reduction in the adjacent white bar width or from printing voids in which the apparent width of the black bar is reduced with a corresponding increase in the width of the adjacent white bar. Printing smears normally result from heavy or intense application of ink to the record, whereas voids result from a light application of ink. In accordance with the present invention, there is provided an encoded record, a method of encoding the record, and a method of error checking the record decoding by which the experienced error rate of around one percent is reduced to an error rate approaching 0.00001 percent.

Figure 3:
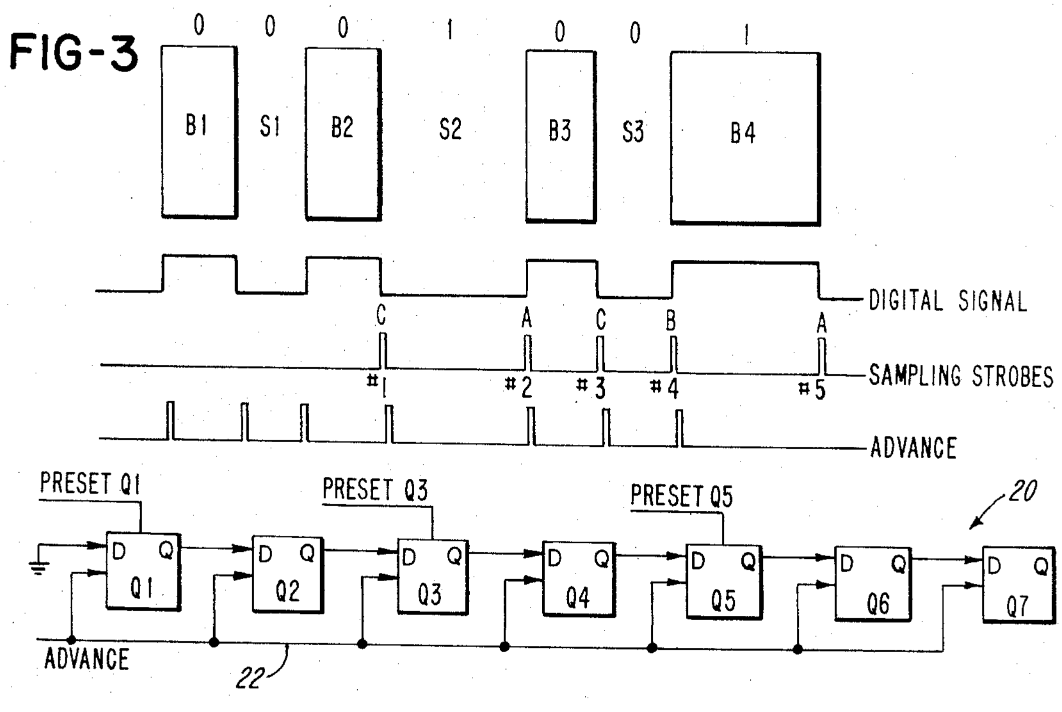
FIG. 3 illustrates one 2–7 character code of a set using four bars which can be translated using the system shown in FIG. 1, the code being illustrated in conjunction with a digitized scanning signal, decoding control signals, and a shift register used in decoding.

More specifically, one character code from a character set embodying the invention is illustrated in FIG. 3 of the drawings and is defined by four black bars B1–B4 and three intervening white spaces S1–S3. The character is defined by width modulating the first five bits formed by the bars B1–B3 and the spaces S1 and S2. The space S3 provides a parity check bit for the bits defined by the spaces S1 and S2, and the bar B4 provides a parity check bit for the black bars B1–B3. The bars B1–B3 and the spaces S1–S2 can be checked for either odd or even parity, but in the illustrated code are checked for odd parity. In addition, the entire seven bit code is checked for the presence of only a single space S1–S3 providing a binary 1 and a single bar B1–B4 defining a binary 1. With such a code the only possible character inversion resulting in an undetected error requires two print faults, and these print faults must be a large void in a bar and a large smear on a bar. Since these faults normally arise from contradictory printing error conditions, i.e., light printing and dark printing, the error probabilities reach the low level referred to above. This character set is referred to as a 2–7 code set. It has also been determined that the expected improvement in error rate can be achieved using two 3–7 code sets in which bars and spaces are separately checked for parity, and a correct code includes three binary 1s, either two 1s defined by bars in one set or two 1s defined by spaces in the other set, with the remaining binary 1 being defined by a space or a bar, respectively.

There is listed below a table setting forth a 2–7 code set adapted for use in accordance with the present invention and illustrating typical width assignments for the various bars B1–B4 and spaces S1–S3. This 2–7 character set includes 12 discrete character codes, and in the following table the widths are expressed in mils: This character set is designed for recording, for example, by using the Model 104 printer provided by Monarch Marking Systems, Inc. of Dayton, Ohio. With the nominal widths shown in the table above, 10 character codes per inch can be recorded on the record 12.

| Characters | B1 | S1 | B2 | S2 | B3 | S3 | B4 |
|---|---|---|---|---|---|---|---|
| 0 0 0 0 0 1 1 | 7 | 9 | 7 | 9 | 7 | 23 | 17.9 |
| 0 0 0 0 1 1 0 | 7 | 9 | 7 | 9 | 17.9 | 23 | 7 |
| 0 0 0 1 0 0 1 | 7 | 9 | 7 | 23 | 7 | 9 | 17.9 |
| 0 0 0 1 1 0 0 | 7 | 9 | 7 | 23 | 17.9 | 9 | 7 |
| 0 0 1 0 0 1 0 | 7 | 9 | 17.9 | 9 | 7 | 23 | 7 |
| 0 0 1 1 0 0 0 | 7 | 9 | 17.9 | 23 | 7 | 9 | 7 |
| 0 1 0 0 0 0 1 | 7 | 23 | 7 | 9 | 7 | 9 | 17.9 |
| 0 1 0 0 1 0 0 | 7 | 23 | 7 | 9 | 17.9 | 9 | 7 |
| 0 1 1 0 0 0 0 | 7 | 23 | 17.9 | 9 | 7 | 9 | 7 |
| 1 0 0 1 0 0 0 | 17.9 | 9 | 7 | 23 | 7 | 9 | 7 |
| 1 1 0 0 0 0 0 | 17.9 | 23 | 7 | 9 | 7 | 9 | 7 |
| 1 0 0 0 0 1 0 | 17.9 | 9 | 7 | 9 | 7 | 23 | 7 |

Another possible source of error in interpreting printed codes wherein both the bars and spaces are modulated arises from more or less uniform increases or decreases in the apparent widths of the bars and an opposite effect on the intervening spaces due to light and heavy printing. Errors in interpretation of a coded record arising from this effect can be obviated by separating comparing bars with bars and spaces with spaces because of the correlated changes in areas of like characteristics. Such a system is shown and described in a copending application Ser. No. 199,231, filed Nov. 16, 1971, and assigned to the same assignee as the present invention.

FIG. 3 of the drawings illustrates in addition to a representative character code from the character set shown in the table above certain waveforms and circuits for interpreting the character code using the technique or algorithm and statements set forth above in conjunction with the description of the code shown in FIG. 2 of the drawings. The method illustrated in FIG. 3 is designed to compare pairs of bars B1–B4 and to compare pairs of spaces S1–S3. Accordingly, statements 1–3 must be restated as statements 16–18 below:

$$\text{Relation } A \text{ implies } t_{n-2} < t_n(1/K). \quad (16)$$

$$\text{Relation } B \text{ implies } t_{n-2} > t_n(K). \quad (17)$$

$$\text{Relation C implies } t_n(K) > t_n{}^{-}{}_2 > t_n(1/K). \quad (18)$$

A comparison of statements 1–3 with statements 16–18 indicates their identity except that conditions $A$, $B$, and $C$ arise in dependence on the relationship between a given area and not the adjacent area, but an area spaced by two in the sequence. Thus, bars are compared with bars and spaces are compared with spaces.

In FIG. 3 of the drawings, there is illustrated a shift register indicated generally as 20 formed of seven stages Q1–Q7 for serially interpreting a 2–7 character set of the present invention. The shift pulse inputs are connected in common to an advance or shift pulse line 22 which receives an advance or shift signal on each bar-space or space-bar transition, as illustrated in FIG. 3. The inputs to the stages Q1–Q7 are connected in series with the input to the input stage Q1 being strapped to ground or a reference potential to enter a binary 0 into the stage Q1 on each advance signal. Priming or preset inputs are provided for the stages Q1, Q3, and Q5 as shown in FIG. 3. The application of a more positive signal to one of these present inputs enters a binary 1 into the stage.

The logic equationsfor decoding a character code in the 2–7 character set using the relations $A$, $B$, and $C$ determined in accordance with statements 16–18 are set forth below in statements 19–21. Since a binary 0 is continuously entered into the input stage Q1 of the shift register 20 on each advance signal, the logic equations 19–21 set forth the condition for presetting 1s into the stages Q1, Q3, and Q5 in dependence on the relation $A$, $B$, or $C$ established in accordance with statements 16 – 18 and the data standing in the shift register 20 at any given time. In the following equations, SS represents any sampling strobe, and # 3, # 4, and # 5 represent the third, fourth, and fifth sampling strobes:

$$\text{Preset Q1} = (SS) \cdot A + (SS) \cdot C \cdot \text{Q3}. \quad (19)$$

$$\text{Preset Q3} = (SS) \cdot B. \quad (20)$$

$$\text{Preset Q5} = (\# 3 + \# 4 + \# 5) \cdot B \cdot \overline{\text{Q3}} \cdot \overline{\text{Q4}}. \quad (21)$$

The necessary logic implementation required for dynamic decoding in the shift register 20 as expressed in statements 19–21 is relatively simple and arises from the fact that the 2–7 code set includes no more than two binary 1s in the seven bits and that these binary 1s can only occupy a small finite number of different positions within the seven bit code.

In general, the first term of statement 19 supplies a binary 1 to the input stage Q1 whenever relation $A$ is established. Relation $A$ states that the bit whose width is being compared is smaller than the last bit scanned, and by implication states that the last bit scanned is larger and thus represents a binary 1. Since the shift register 20 is always three steps in advance of the first comparison or sampling strobe due to the three advance signals preceding the first sample strobe (see FIG. 3), the stage Q1 is the proper stage in which to preset the binary 1. With respect to the second term in statement 19, if stage Q3 is set indicating a binary 1 and a condition $C$ arises implying equality, Q1 must also be 1, and Q1 is preset to a binary 1 setting.

With regard to the presetting of Q3 under the conditions expressed in statement 20, the establishment of relationship $B$ indicates that the stored width being compared, i.e., $t_n{}^{-}{}_2$, is greater in width than the like area just scanned, i.e., $t_n$. Since, again, the setting of the shift register 20 is three steps ahead of the current comparison, the established binary 1 for the area $t_n{}^{-}{}_2$ should be primed into stage Q3, the shift register stage in the sequence in which this code bit belongs.

Statement 21 takes care of a special condition in one of the character codes in the set shown above in which the binary 1s appear in the first two spaces. This will initially result in the establishment of a condition of equality on the first sample. Accordingly, the decision on the value to be entered must be delayed. As set forth in statement 21, when the greater than relationship $B$ is established and binary 1s are not stored in stages Q3 and Q4, Q5 can be preset to a 1 condition during the third, fourth, and fifth sampling strobes.

The sequence of decoding the character shown in FIG. 3 is illustrated in the following table, with $X$ denoting bits of unknown or arbitrary value:

| | Q1 | Q2 | Q3 | Q4 | Q5 | Q6 | Q7 |
|---|---|---|---|---|---|---|---|
| Advance No. 1 No Strobe | 0 | X | X | X | X | X | X |
| Advance No. 2 No Strobe | 0 | 0 | X | X | X | X | X |
| Advance No. 3 | 0 | 0 | 0 | X | X | X | X |
| Sample No. 1 — C | 0 | 0 | 0 | X | X | X | X |
| Advance No. 4 | 0 | 0 | 0 | 0 | X | X | X |
| Sample No. 2 — A | 1 | 0 | 0 | 0 | X | X | X |
| Advance No. 5 | 0 | 1 | 0 | 0 | 0 | X | X |
| Sample No. 3 — C | 0 | 1 | 0 | 0 | 0 | X | X |
| Advance No. 6 | 0 | 0 | 1 | 0 | 0 | 0 | X |
| Sample No. 4 — B | 0 | 0 | 1 | 0 | 0 | 0 | X |

-Continued

| | Q1 | Q2 | Q3 | Q4 | Q5 | Q6 | Q7 |
|---|---|---|---|---|---|---|---|
| Advance No. 7 | 0 | 0 | 0 | 1 | 0 | 0 | 0 |
| Sample No. 5 — A | 1 | 0 | 0 | 1 | 0 | 0 | 0 |

With reference to FIG. 3 and the above table, the first advance pulse results in the entry of a binary 0 in the input stage Q1. Since sampling strobe signals are not generated by the control system prior to the next two advance signals, these two advance signals shift binary 0s into the first three stages Q1–Q3 as the reader 14 passes over the first bar B1, the first space S1, and enters the second black bar B2. When the reader 14 reaches the end of the second black bar B2, the system has stored in three discrete counters the widths of the first two black bars B1 and B2 and the width of the first space S1. In addition, the system has stored the product and quotient of the constant *K* and the width of the second black bar B2 in two reference counters.

At this time, the system generates sampling strobe No. 1 which controls the decoding logic to compare the width of the first black bar B1 with the product and quotient reference values based on the second black bar B2. Since only statement (18) is satisfied at this time, a relation C is established. Further and by reference to statements 19–21, none of the logic equations for presetting any of the stages in the shift register 20 are satisfied, the fourth advance pulse enters a binary 0 into the input stage Q1, and the previously entered binary 0s are shifted to the stages Q2–Q4.

As the reader 14 advances across the record 12 and through the second space S2, this value is stored in one of the storage registers, and the product and quotient reference values based on the width of the space S2 are stored in the reference registers. When the second sampling strobe No. 2 is generated, the value of the width of the first space S1 is compared with the quotient and product reference values based on the width of the space S2, and the condition A defined by statement 16 is established. Since the sampling strobe SS is present, the first term of logic equation 19 is satisfied, and Q1 is preset to a binary 1 condition, as shown in the above table. On the following or fifth advance pulse, this binary 1 is shifted into stage Q2, a binary 0 is shifted into input stage Q1, and the preceding three binary 0s are shifted into the stages Q3–Q5.

As the reader 14 advances over the record 12 through the third black bar B3, a relation *c* is established on sampling strobe #3 in accordance with statement 16, and none of the stages of the shift register is preset since none of statements 19–21 is satisfied. Accordingly, on the following advance signal, a binary 0 is entered into the input stage Q1, and the remaining bits are shifted one step to the right as shown in the above table.

Further movement of the reader 14 results in the storage of product and quotient reference values based on the width of the third space S3, and the fourth sampling strobe #4 compares the previously stored width of the second space S2 with these reference values. This comparison results in the establishment of relation *B* by satisfying statement 17. This in turn satisfies statement 20 so that Q3 is preset. However, Q3 is in a set condition, and presetting of Q3 does not change the status of the data stored in the shift register 20 (see table above).

On the seventh and last advance pulse, the data is shifted one step or stage to the right so that the stages Q1–Q7 of the shift register 20 are filled. At this time, all of the stages of the register store binary 0s except for stage Q4 which stores a binary 1.

The reader 14 now passes over the last black bar B4 so that product and quotient reference values based on the width of this bar are stored. At the end of the bar B4, the fifth sampling strobe #5 is generated, and the reference values based on the width of the bar B4 are compared with the stored width of the smaller black bar B3. This comparison establishes relation *A* which in turn satisfies the first term of statement 19 so that a 1 is preset into the first stage Q1 of the shift register 20 (see last line of table above). At this time, the decoded character is stored in the shift register 20 in reverse order with a binary 0 of the first black bar B1 stored in the stage Q7 and with the binary 1 of the last black bar B4 stored in the first stage Q1. The decoded character is now checked for a correct code and, if correct, transferred to a utilization or output means.

As set forth above, the character set from which the character code shown in FIG. 3 is taken is one in which the first five bits defined by B1, S1, B2, S2, and B3 define the character, in which the space S3 provides a parity check bit for the data bits encoded by the spaces S1 and S2, and in which the black bar B4 provides a parity bit for the data bits encoded by the bars B1–B3. Further, the character set is such that there is only one wide space and one wide bar in the code so that only one binary 1 is encoded in the spaces S1–S3 and only one binary 1 is encoded by the black bars B1–B4. Stated alternatively, the character code has *N* five data bits encoded in areas or signals of different characteristics in which *X* three bits are encoded by the bars B1–B3 and *Y* two bits are encoded at a different level with a different characteristic by the spaces S1 and S2. The character code is completed by the two additional parity bits in which the parity bit provided by the bar B4 provides a check for the *X* bits encoded by the bars B1–B3 and the space S3 provides a parity bit for the *Y* bits encoded by the bars S1 and S2. Accordingly, the complete character code includes $N + 2$ bits. It should be noted that although the coding is described with reference to the black and white bars or spaces, the coding and checking technique described above is useful with and is, in fact, applied to the multilever digital signal resulting from these bars and spaces, as illustrated in FIG. 3.

With this character set, a correct or proper character code can be established by determining whether one binary 1 is encoded in the spaces S1–S3 and one binary 1 is encoded in the bars B1–B4 and by insuring that odd parity exists for the spaces S1–S3 and for the bars B1–B4. The bar encoded data is stored in the odd numbered stages Q1, Q3, Q5, and Q7 of the shift register 20, and the space encoded information is stored in the even numbered stages Q2, Q4, and Q6 of this shift register. Accordingly, the logic equation defining a good character can be expressed as follows:

$$\text{Good Character} = [Q1\cdot\overline{Q3}\cdot\overline{Q5}\cdot\overline{Q7} + \overline{Q1}\cdot Q3\cdot\overline{Q5}\cdot\overline{Q7} + \overline{Q1}\cdot\overline{Q3}\cdot Q5\cdot\overline{Q7} + \overline{Q1}\cdot\overline{Q3}\cdot\overline{Q5}\cdot Q7]\cdot[Q2\cdot\overline{Q4}\cdot\overline{Q6} + \overline{Q2}\cdot Q4\cdot\overline{Q6} + \overline{Q2}\cdot\overline{Q4}\cdot Q6] \quad (22)$$

Accordingly, by coupling the true and false outputs or Q and $\overline{Q}$ outputs of the stages Q1–Q7 of the shift register 20 to a logic gating network, the correctness of each code stored in the shift register 20 can easily be determined before transferring this character to the utilization means.

Referring now more specifically to FIG. 1 of the drawings, therein is illustrated in block form a system embodying the present invention and capable of translating or decoding a character set including the character code shown in FIG. 3. In general, the system 10 is controlled by the reader 14 during relative movement between this reader and the record 12 to search for and detect a proper start code, reading the record 12 in either a forward or a reverse direction. When a proper start condition is detected, the system 10 translates successive character codes forming a message and transfers these characters to an output or utilization means. The system is restored to its search mode from the read mode in which characters are decoded in response to the detection of a stop condition. In the event that an error in the character code is detected, the system is reset, and the reading of the message on the record 12 must be started once again.

The reader 14 is coupled to a timing and control circuit 24 which includes means for digitizing the analog signal received from the reader 14 and for performing various clearing and resetting operations. As each bar or space is read by the reader 14, the control circuit 24 controls a gate assembly 26 so that values corresponding to the widths of three areas, either two bars and a single space or two spaces and a single bar, are stored in sequence in three counters 28, 30, and 32. Assuming that the code properly begins with a black bar, the first black bar width is stored in the counter 28, the first space width is stored in the counter 30, and the second black bar width is stored in the counter 32. Concurrently with storing the second bar width in the counter 32, the control circuit 24 controls a pair of reference counters 34 and 36 to store the product of a constant and the width of the second black bar in a reference value counter 34 and to store the quotient of the width of the second black bar and the constant in a reference value counter 36.

To initiate the first comparison operation so as to determine the existing relation defined by one of the statements 16–18, the control circuit 24 controls a steering circuit 38 to supply the width value of the first black bar stored in the counter 28 through the steering circuit 38 to a pair of adders 40 and 42. These adders are also coupled to the outputs of the reference value counters 34 and 36 in which are standing the product and quotient reference values based on the second black bar. By selectively coupling true and complement outputs to the adders 40 and 42, the width of the first black bar stored in the counter 28 is compared with the reference values stored in the counters 34 and 36 by the adders 40 and 42, and the outputs of these two adders representing the presence or absence of the relations *A* and *B* is supplied to a decoding logic circuit 44. The absence of either relation *A* or relation *B* implies the existence of relation *C.* The decoding logic circuit 44 is coupled to the shift register 20.

The decoding logic circuit 44 in dependence on the existence of the conditions specified in statements 19–21 selectively enters binary 1s in the shift register 20, the shift register being advanced and supplied with shift pulses under the control of the circuit 24.

After the value based on the comparison of the first and second black bars is completed and as the reader 14 enters the second space, the counter 28 is cleared and supplied with the width of the second space, and corresponding reference values based on the width of the second space are stored in the reference value counters 34 and 36. The control circuit 24 then controls the steering circuit 38 to transfer the width value of the first space stored in the counter 30 through the steering circuit 38 to the input of the adders 40, 42 in which it is compared with the reference values stored in the counters 34 and 36 based on the width of the second space. The outputs of the adders 40, 42 control the decoding logic 44 to supply an input to the shift register 20 based on the established relation. These values are shifted along the register 20 by the control circuit 24.

As the reader 14 moves into the third black bar, the counter 30 is cleared, and the width of the third black bar is stored in this counter while the product and quotient reference values based on the width of this third black bar are stored in the counters 34 and 36. The control circuit 24 controls the steering circuit 38 to supply the width of the second black bar now stored in the counter 32 to the inputs of the adders 40, 42 in which it is compared with the reference values based on the width of the third black bar stored in the counters 34 and 36. The results of this comparison operation are supplied to the decoding logic 44 which then effects the entry of the proper binary bit into the shift register 20, and this register is advanced or shifted a single stage.

This operation continues during the remaining of the first scanned code. If the shift register 20 is found to contain a proper start code read either in a forward or a reverse direction, the system 10 is shifted from a search mode to a read mode, and the system 10 translates or decodes the first character code on the record 12 and stores the results thereof in the shift register 20. If this code is correct, as determined by the parity checking means, the contents of the shift register 20 are supplied in serial or in parallel to an output means 46, and the system 10 starts the translation of the next character code in the message.

These operations continue until such time as the complete message has been checked, as determined by the receipt of a proper stop code. When the stop code is detected, the system 10 is returned from its read mode of operation to its search mode of operation in which it continuously monitors data supplied by the reader 14 for a set of codes comprising a proper start condition.

Figure 4:
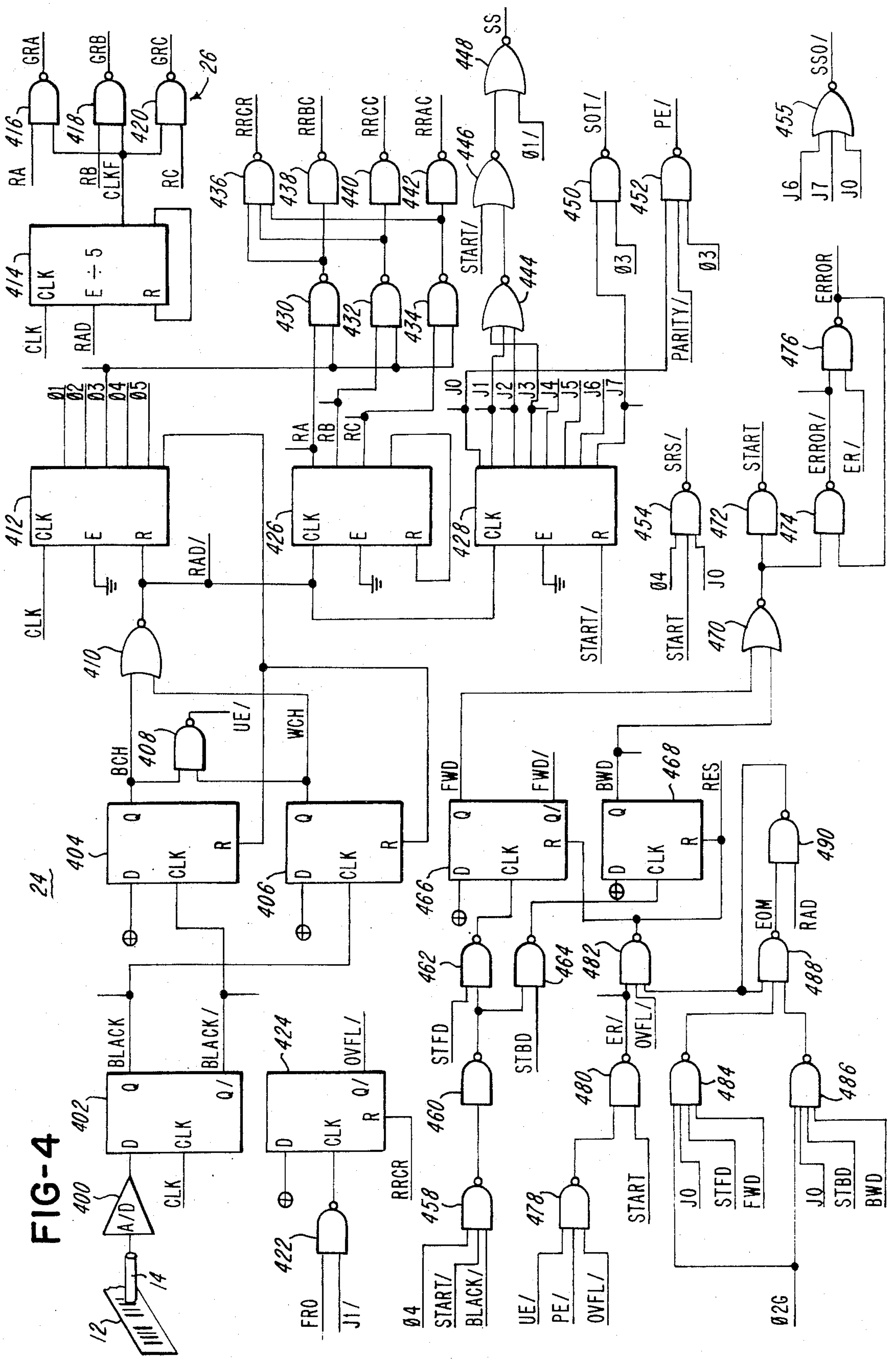
FIG. 4 is a circuit diagram in logic form illustrating certain control components of the system of FIG. 1.
Figure 5:
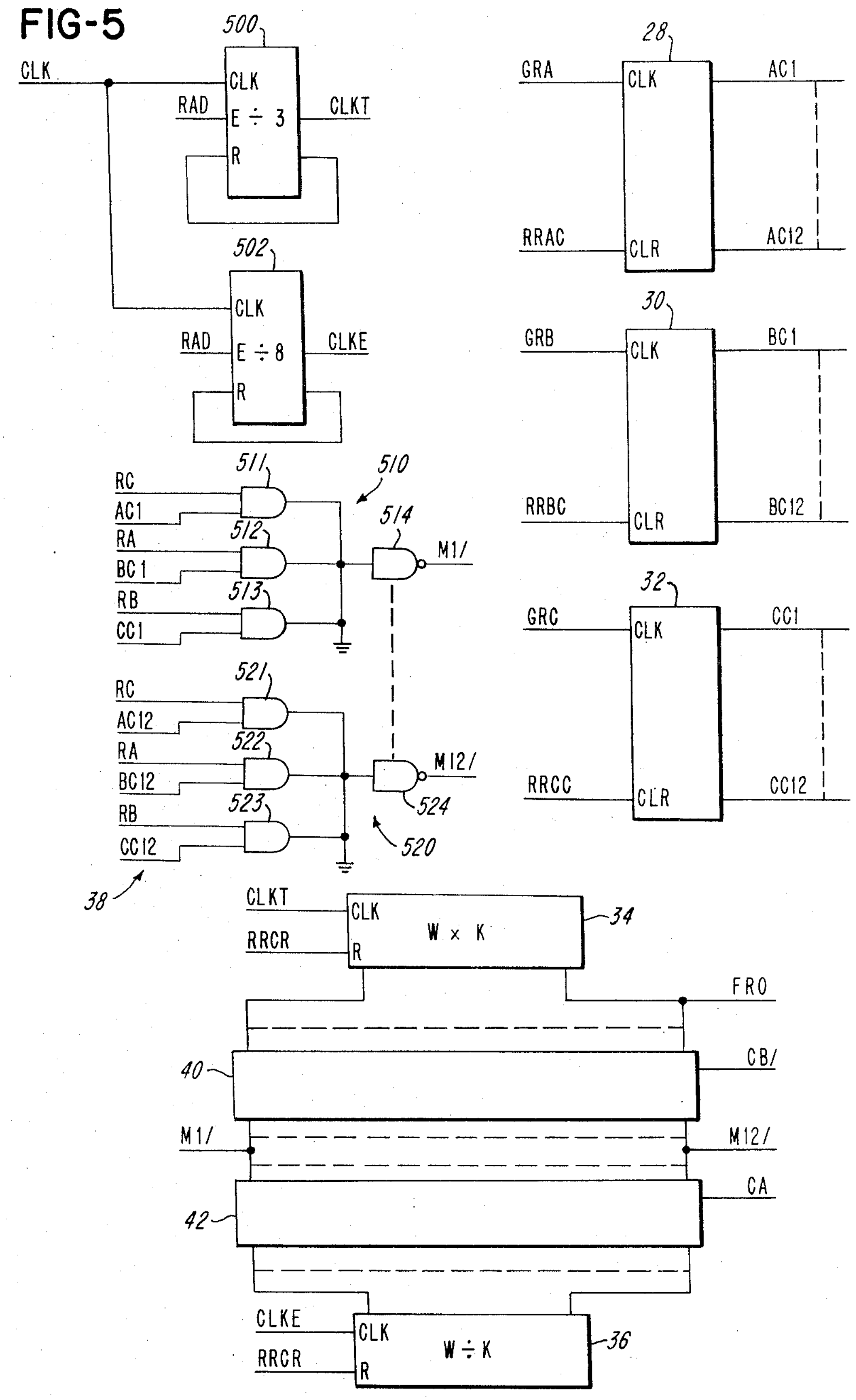
FIG. 5 is another logic circuit diagram illustrating code area size registers, reference value registers, and comparators forming a part of the system shown in FIG. 1.
Figure 6:
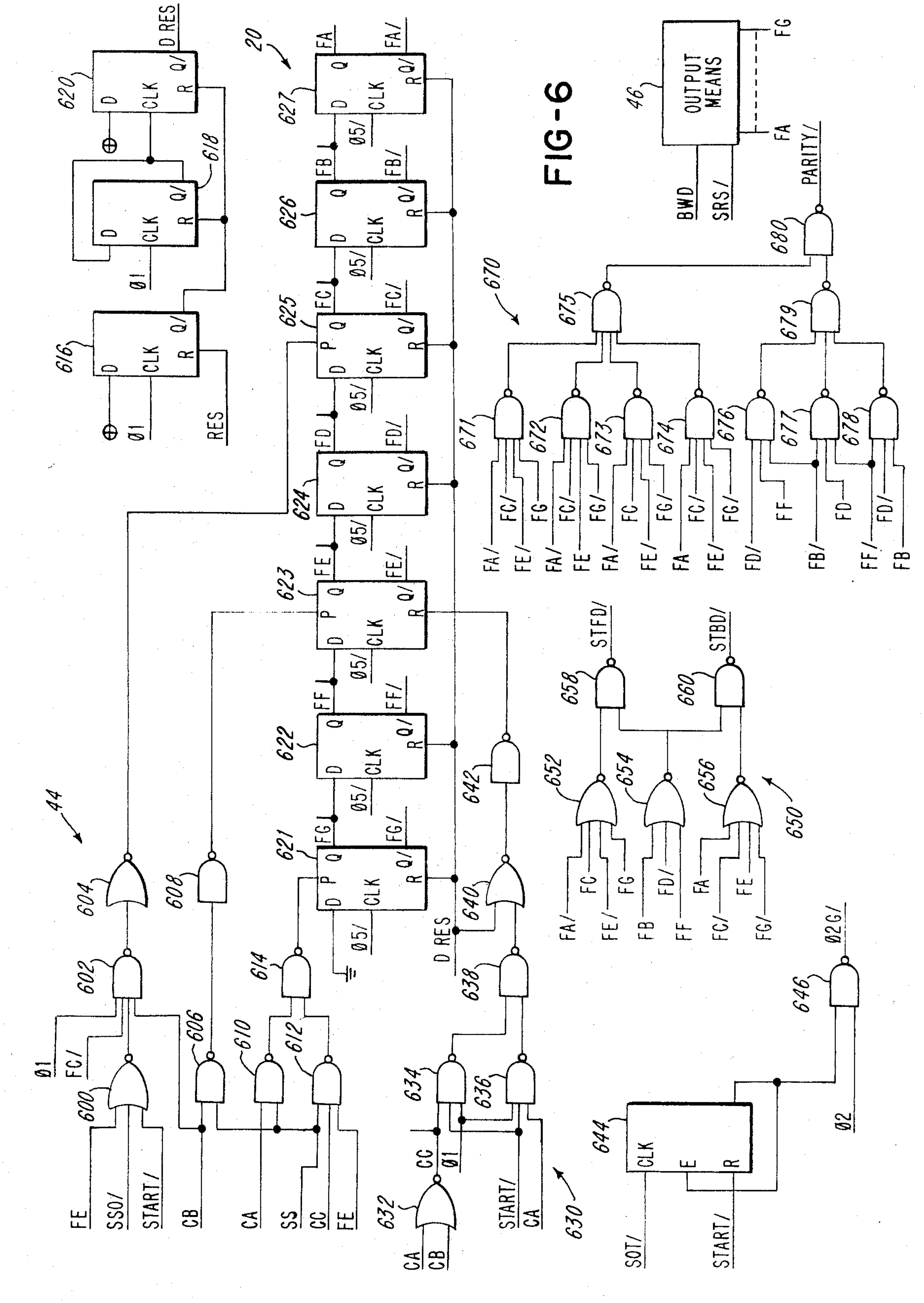
FIG. 6 is a logic circuit diagram illustrating certain control and decoding logic components of the system of FIG. 1.

The circuitry of the system 10 is illustrated in FIGS. 4–6 of the drawings in simplified logic form using NAND and NOR logic. In one embodiment constructed in accordance with the present invention, the logic components from which the system 10 was constructed used complementary symmetry MOS devices (COS/MOS) manufactured and sold by the Solid State Division of RCA in Summerville, N.J. The family of devices used is identified as the CD4000A series of logic components. Obviously, however, the system 10 could be constructed using different families of logic elements, i.e., TTL logic devices, or could be implemented using other types of logic functions, such as AND and OR devices.

In the following description, the signals generated by the various logic components and used for control functions are designated by alphabetical or alphanumeric designations. Throughout the description, the corresponding signal in an inverted form is indicated by the same designation followed by "/". As an example, a signal BLACK generated by a flip-flop 402, FIG. 4, is thus identified, and its inverted signal is identified as BLACK/.

As indicated above, the message on the record 12 can be disposed between a beginning start code and a terminating stop code, and this message is capable of being read in forward or reverse direction. In the embodiment of the system 10 shown in FIGS. 4–6, the message is preceded and followed by a single code which, read in its forward direction, implies reading in a forward direction, and when read in its reverse direction advances the system 10 that the record 12 is being read in a reverse direction. Although a number of start codes or a number of different start and stop codes can be used, the illustrated system 10 is designed for use with a single start code from the 3–7 character set. Thus, this code includes three binary 1s rather than two binary 1s. The selected start code used in the system shown in FIGS. 4–6 is 1001100 when read in a forward direction and 0011001 when read in a reverse or backward direction. This start code is such that on decoding, only relations or conditions A and B in accordance with statements 16 and 17 will be established, and a relation *C* implying equality in accordance with statement 18 will not be established. This selection of the start code assists in discarding spurious start codes resulting from optical "hash" that they may be generated incident to initiating relative movement between the record 12 and the reader 14.

As noted above, the system 10 is normally in a search condition in which the contents of the shift register 20 are continuously monitored for the presence of a valid start code read in either a forward or a backward direction. During this interval, the control circuit 24 continuously provides sampling strobes so that the coding logic 44 can search for a valid start condition as each bar-space or space-bar transition occurs. After a valid start code is found, the system switches to a read condition in which sampling strobes are provided as set forth above in the description of the decoding logic with respect to FIG. 3 of the drawings. The search or read status of the system 10 is established by the condition of a pair of flip-flops 466 and 468. The flip-flop 466 is set when a valid start code read in the forward direction has been detected, and the flip-flop 468 is set when a valid start code read in a backward direction has been detected. Accordingly, when both of the flip-flops 466 and 468 are reset, the output of a NOR gate 470 is at a more positive potential and is effective through an inverter 472 to provide a more negative start signal START or a more positive signal START/. The level of the signal START controls the search or read status of the system 10.

Figure 8:
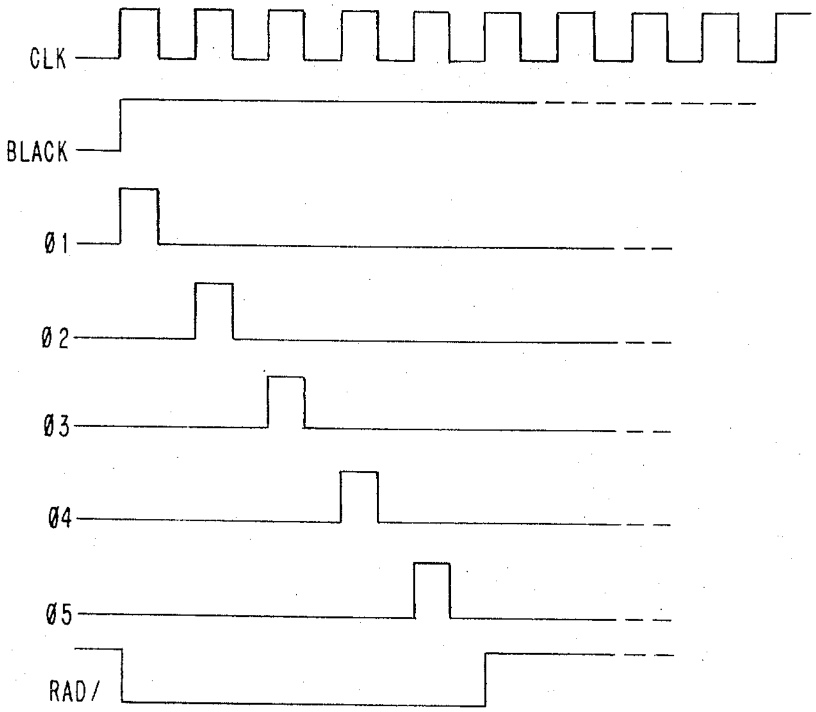
FIGS. 8 and 9 illustrate certain timing and control signals used in the record reading circuit of the present invention.

Assuming that the system 10 is in a search condition as represented by a more positive signal START/ and that the record 12 is to be read in a reverse direction by the reader 14 so that the terminating start code as well as the message initiating start code will be read in a reverse direction, the reader 14 is placed adjacent the record 12, and relative movement is produced therebetween. The output of the reader 14 is coupled through an analog-to-digital converter 400 to the D terminal of a flip-flop 402. As the reader 14 enters the first black bar of the reverse-read start code, the potential applied to the D terminal of the flip-flop 402 rises to a more positive level. On the following positive-going transition of a master clock signal CLK for the system 10, the flip-flop 402 is set to provide a more positive signal BLACK (FIG. 8). This positive-going signal sets a flip-flop 406 to provide a more positive signal WCH which is effective through a NOR gate 410 to provide a low level signal RAD/. The generation of the low level signal RAD/ initiates the generation of a common group of timing signals used to control the operation of the system 10.

More specifically, the signal RAD/ is applied to the reset terminal of a Johnson counter 412 which is advanced by the clock signal CLk whenever an enabling input terminal E is held at a reference or low level potential. The Johnson counter 412 is a counter providing discrete decoded outputs 01–05 in response to successive input signals CLK. Accordingly, when the signal BLACK rises to a high level and the signal RAD/ drops to a low level, the clock signal CLK advances the counter 412 to provide a more positive signal 01 (FIG. 8). On successive clock signals CLK, the signals 02–05 are generated. If desired, the enabling terminal E of the counter 412 can be coupled to one or more flip-flops connected in series and supplied with clock signals CLK to provide one or more clock period delays between the setting of the flip-flop 402 and the initiation of the counting operation of the counter 412, if it becomes desirable to delay this operation to prevent propagation delays from interfering with the logic of the circuit 10.

On the next clock signal CLK following the signal 05, the counter 412 is advanced to a setting to provide a more positive reset signal to the reset terminals R of the flip-flop 406 and a similar flip-flop 404. When both of the flip-flops 404 and 406 are reset, the signal WCH and a similar signal BCH are both at a low level, and the signal RAD/ provided at the output of the NOR gate 410 rises to a high level to hold the counter 412 in a reset condition to prevent further operation under the control of the clock signal CLK.

Each time that the reader 14 enters a white bar or space, the unit 400 holds the *D* input terminal of the flip-flop 402 at a low level, and the clock signal CLK resets this flip-flop so that a signal BLACK/ becomes more positive. The leading edge of this signal sets the flip-flop 404 to provide a more positive signal BCH. This signal is effective through the gate 410 to remove the inhibit applied to the reset terminal R of the counter 412, and this counter operates through a cycle of operation to generate the timing signals 01–05 to thereafter reset the flip-flops 404, 406 and elevate the signal RAD/ to a more positive level. Thus, on each barspace or space-bar transition, the counter 412 is operated through one cycle to develop the phase or timing signals 01–05.

In addition, the transitions in the state of the signal RAD/ control the operation of two additional Johnson counters 426 and 428. The counter 426 is a steering circuit providing in sequence three more positive steering signals RA, RB, and RC on successive positive-going transitions in the signal RAD/. The more positive output from the counter 426 following the signal RC is applied to the reset terminal R of this counter so that the signal RA immediately follows the signal RC. Since the counter 426 is advanced on the positive-going edge of the signal RAD/ (compare FIGS. 8 and 9), the counter 426 advances through a cycle on each three transitions in the signal level applied to the input of the flip-flop 402.

The Johnson counter 428 is provided for counting bit positions within each seven bit character. The enable terminal E of the counter 428 is provided with a continuous low level enabling signal. However, the reset terminal R of the counter 428 is provided with the signal START/ so that the counter 428 is disabled until such time as the system 10 is placed in a read condition. In the reset state of the counter 428, a signal J0 is more positive. The counter 428 provides successive signals J1–J7 on successive positive-going transitions of the signal RAD/. Further, the timing of the development of the signal RAD/ on detecting a start condition to remove the inhibit from the reset terminal R of the counter 428 is such that the signal J1 defines the white space separating characters, the signals J2–J7 define the first through sixth bit positions, and the signal J0 defines the seventh or last bit position of each character code. These signals are, however, not generated when the system 10 is in the search mode, and the signal J0 remains at a high level during the search mode (see FIG. 9).

Referring back to the above-described assumption that the start code is being read in a reverse direction on the record 12 by the reader 14, the reader 14 enters the first black bar of the start code and sets the flip-flops 402 and 406 so that the Johnson counter 412 operates through a cycle in which the signals 01–05 are produced in sequence followed by the resetting of the flip-flop 404. The first three signals 01 produced by the counter 412 at the initiation of the reading of the record 12 are counted and used to control the enabling of the shift register 20. More specifically, the shift register 20 comprising seven stages 621–627 (FIG. 6) are normally held in a reset state by a more positive signal D RES provided at the output of a flip-flop 620. This signal is directly applied to all of the stages 621–627 with the exception of the stage 623. The signal D RES is forwarded through a NOR gate 640 and an inverter 642 to hold the stage 623 reset. The flip-flop 620 is the output of a counter including two additional flip-flops 616 and 618. This counter basically absorbs the first three signals 01 produced by the counter 412 to prevent spurious signals from entering the shift register 20 at the beginning of the reading operation and thereby reduce the possibility for false start codes being introduced into the register 20.

Accordingly, the first 01 signal produced when the reader 14 enters the first black bar of the start code sets the flip-flop 616 to remove a continuous high level reset signal from the reset terminals R of the flip-flops 618 and 620. The second signal 01 sets the flip-flop 618 so that a low level signal is applied to the clock terminal CLK of the following flip-flop 520. On the following or third signal 01, the flip-flop 618 is reset, and the more positive signal derived from its Q/ output sets the flip-flop 620. When this flip-flop 620 is set, the signal D RES drops to a low level, and the stages 621–627 of the shift register 620 are enabled to receive input information.

Figure 9:
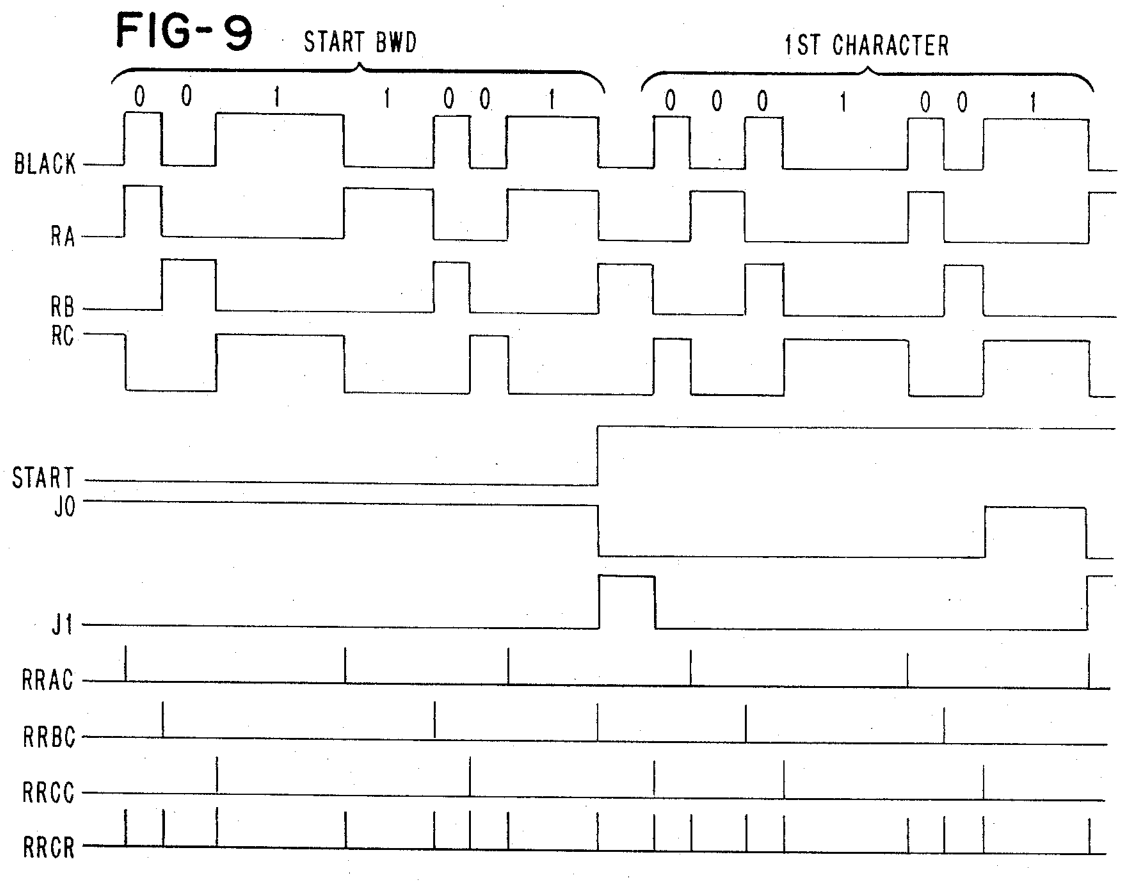

Referring back to the first cycle of operation of the counter 412 and assuming that a counter 426 is in a condition providing a more positive signal RC when the reader 14 enters the first bar (see FIG. 9), the more positive signal RC partially enables a gate 434 forming one of a set of three gates 430, 432, and 434 for supplying signals for selectively resetting the value storing counters 28, 30, 32, 34, and 36. When the counter 412 generates the signal 03 incident to the reader 14 entering the first black bar in the reverse read start code, the gate 434 is fully enabled to provide a low level output which is forwarded through an inverter 442 to provide a more positive signal RRAC (FIG. 9). This signal is applied to the reset or clear terminal CLR of the counter 28 to reset this counter to its normal state. The low level signal from the gate 434 also controls a NAND gate 436 to provide a more positive signal RRCR for the duration of the signal 03. The signal RRCR is applied to the reset terminals of the product and quotient reference value registers 34 and 36 to reset these registers.

When the signal RAD/ rises to a more positive level (FIG. 8) after the resetting of the flip-flop 406, further operation of the counter 412 is inhibited. The positive-going signal RAD/ advances the counter 426 a step so that a more positive signal is applied to the reset terminal of this counter. When the counter 426 is reset, the signal RA becomes more positive. This signal and the related signals RB and RC control the gate assembly 26 including three NAND gates 416, 418, and 420 to store the widths of bars and spaces in the counters 28, 30, and 32. More specifically, the system 10 includes a divide by five counter 414 which can comprise a Johnson counter, the fifth output of which supplies a signal CLKF which is applied to one input of each of the gates 416, 418, and 420. The counter 414 is normally disabled by the more positive signal RAD during the interval in which the signals 01–05 are generated. However, the signal RAD drops to a low level when the counter 426 is advanced and supplies the output signal CLKF at one-fifth the rate of the clock signal CLK. Since the gate 416 is partially enabled by the more positive signal RA, the gate 416 provides a series of signals GRA at one-fifth the clock pulse rate. The signals GRA are applied to the clock input of the counter 28. This counter is a ripple counter with true binary outputs AC-1–AC12. As described above, this counter was reset by the gate 434 just preceding the development of the more positive signal RA by the counter 426. Thus, the value of the width of the first black bar in the start code read in a reverse direction can now be stored in the ripple counter 28.

The signal RAD also controls the storage of a product reference value in the counter 34 and a quotient reference value in the counter 36 based on the value of the first black bar whose width is now being stored in the counter 28. More specifically, the system 10 includes a divide by three counter 500 and a divide by eight counter 502, both of which are Johnson counters. During the period in which the signals 01–05 are generated by the counter 412, the signal RAD is at a high level, and operation of the counters 500 and 502 is inhibited. However, at the end of the transition period in which the signals 01–05 are generated, the signal RAD drops to a low level and enables these two counters. The output of the counter 500 is a signal CLKT which is a series of clock pulses at one-third the rate of the clock signal CLK. The output of the counter 502 is a series of signals CLKE appearing at one-eighth the rate of the clock signal CLK. The signals CLKT are applied to the clock or count input CLK of the product counter 34, and the signals CLKE are applied to the count or clock input CLK of the quotient counter 36. Thus, the counters 414, 500, and 502 are simultaneously rendered effective by the low level signal RAD to provide the signals CLKF, CLKT, and CLKE to accumulate the code area width value in one of the registers 28, 30, or 32 and the corresponding product and quotient reference values in the registers 34 and 36, respectively.

Since the width value is accumulated at one-fifth the clock pulse rate while the product and quotient reference values are accumulated at one-third and one-eighth clock pulse rates, respectively, the constant by which the width value is multiplied and divided, respectively, is 1.6. This constant *K* was selected to provide optimum printing tolerance with regard to large and small bars and large and small spaces in a 2–7 and 3–7 code of the type referred to above. Obviously, however, this constant can vary in dependence on such factors as permissible printing tolerance and bit packing density required.

Accordingly, as the reader 14 enters the first black bar in the reverse read start code, the signal GRA accumulates the width of this first black bar in the previously cleared register 28, and the product and quotient reference values based on the width of this first black bar are stored in the counters 34 and 36.

When the reader 14 leaves the first black bar and enters the first white space, the flip-flop 402 is reset to provide a more positive signal BLACK/ which sets the flip-flop 404. When the flip-flop 404 is set, the NOR gate 410 provides a more negative signal RAD/. This releases the counter 412 to generate the signals 01–05. Further, when the signal RAD/ drops to a low level, the signal RAD becomes more positive to inhibit further counting in the counting circuits 414, 500, and 502. Thus, the accumulation of values in the registers 28, 34, and 36 is terminated. When the signal 03 is developed, the gate 430 is fully enabled to provide a more positive signal RRBC through an inverter 438. The signal RRBC is applied to the clear terminal CLR of the counter 30 to clear this counter to receive the next width value to be stored. Further, the low level output from the gate 430 is effective through the gate 436 to provide the signal RRCR to clear the reference value registers 34 and 36. These values are not used inasmuch as the data necessary for the first comparison is not accumulated until the third code area has been read.

After the development of the signal 05, the flip-flop 404 is reset, and the signal RAD/ rises to a more positive level. This advances the counter 426 so that the more positive signal RA is terminated, and a more positive signal RB is provided (FIG. 9). The more positive signal RB partially enables the gate 418. Further, when the signal RAD/ rises to a more positive level, the signal RAD drops to a low level to remove the inhibit from the counters 414, 500, and 502. Thus, the signal CLKF is forwarded through the partially enabled gate 418 to provide a pulse stream GRB which is applied to the clock or count input CLK of the previously cleared counter 30. Thus, the system 10 now stores the width of the first space in the reverse read start code in the counter 30 and accumulates the product and quotient reference values related thereto in the counters 34 and 36. When the end of the first space or white bar is reached and the reader 14 enters the second black bar, the flip-flops 402 and 406 are set, and the signal RAD/ drops to a low level so that the counter 412 runs through its third cycle of operation. When the signal 03 is developed, the gate 432 is fully enabled and is effective through an inverter 440 to provide a reset signal RRCC (FIG. 9). This signal is applied to the clear terminal CLR of the counter 32 and clears this counter to receive the width of the second black bar. In addition, the low level signal from the gate 432 is effective through the gate 436 to again generate the signal RRCR (FIG. 9) which clears the product registers 34 and 36 because the comparison operation is not yet to be performed.

When the flip-flop 406 is reset by the counter 412, the signal RAD/ rises to a high level and advances the counter 426 so that the signal RB drops to a low level, and the signal RC rises to a high level. The signal RC partially enables the gate 420 in the gate assembly 26. Further, the signal RAD drops to a low level, and the counters 414, 500, and 502 are again freed for operation under the control of the clock signal CLK to accumulate the width of the second black bar in the counter 32 through the signal GRC provided by the gate 420 and to accumulate in the ripple counters 34 and 36 the product and quotient reference values, respectively. These values are completely stored when the reader 14 reaches the end of the black bar to reset the flip-flop 402 and to set the flip-flop 404 so that the signal RAD/ drops to a low level once again.

At this time, the first comparison operation is performed inasmuch as three code areas in the reverse read start code have been traversed by the reader 14.

Referring to the previously described operation of the counting circuit including the flip-flops 616, 618, and 620, which control the reset signal D RES, the flip-flop 620 was set to remove the signal D RES leaving all of the stages 621-627 of the shift register 20 in a reset state when the reader 14 provided the third transition on entering the second black bar. Data stored in the shift register 20 is advanced or shifted to the right (FIG. 6) by the signal 05/, and the input terminal D of the input stage 621 (Q1) is strapped to ground to enter a binary 0 in the input stage on each shift signal 05/. As described above in conjunction with FIG. 3 of the drawings, the first three shift signals 05/ should have shifted binary 0s into the first three stages 621–In view of the persistence of the signal D RES through the first three signals 05, binary 0s cannot be shifted into the shift register 20. However, since the signal D RES holds all of the flip-flops in a reset condition, binary 0s are now stored in the first three stages 621–623 just as if the shift signals 05/ had been rendered effective.

Referring back to the reader 14 leaving the second black bar and entering the second white bar to provide the low signal RAD/, corresponding high level signals RAD inhibit the counters 414, 500, and 502 so that the following values are now stored in the registers 28, 30, 32, 34, and 36:

1. The counter 28 stores the width of the first black bar.
2. The counter 30 stores the width of the first space.

3. The counter 32 stores the width of the second black bar.
4. The product counter 34 stores the product of the width of the second black bar and the constant $K$ (1.6).
5. The quotient reference value counter 36 stores the quotient of the width of the second black bar and the constant $K$ (1.6).

With the counter 412 now released by the low level signal RAD/, the signal 01 is generated. This signal provides the sampling strobe used by the decoding logic 44 and is provided through the decoding logic on each transition when the system 10 is in its search mode.

The logic equations previously set forth in statements 19, 20, and 21 for presetting the first, third, and fifth stages of the shift register 20 can be restated in the following statements 23, 24, and 25 modified to include the logic requirements for interpreting the start code from the 3–7 character set. In the following statements, the shift register stages Q1–Q7 correspond to the shift register stages 621–627, respectively. The remaining notations represent the signals previously referred to above:

$$\text{Preset Q1} = (A\cdot 01\cdot \text{START/}) + (A\cdot 01).\ (J4 + J5 + J6 + J7 + J0) + (C\cdot 01\cdot Q3).\ (J4 + J5 + J6 + J7 + J0) \quad (23)$$

$$\text{Preset Q3} = (B\cdot 01\cdot \text{START/}) + (B\cdot 01)(J4 + J5 + J6 + J7 + J0) \quad (24)$$

$$\text{Preset Q5} = (B\cdot 01\cdot \text{START})\cdot(J6 + J7 + J0)\cdot\overline{Q3}\cdot\overline{Q5} \quad (25)$$

From considering the above, statement (23) specifies that Q1 or the input stage 621 will be preset to a binary 1 condition when relation $A$ is established, the system 10 is in a search condition, and the timing signal 01 appears. The first term in statement 24 specifies that Q3 or the third shift register stage 623 will be primed to a binary 1 condition when relation $B$ is established, the system 10 is in a search condition, and the timing signal 01 appears.

To provide means for selectively establishing the conditions $A$ and $B$ and by implication the condition or relation $C$, the true outputs of the ripple counters 34 and 36 are individually connected to corresponding ordered inputs to the full adders 40 and 42. The other sets of inputs to the full adders 40 and 42 comprise the complements of the outputs from a selected one of the width value storage registers or counters 28 or 30 or 32 and are designated as M1/–M12/. These signals are provided by the multiplexer or steering circuit 38.

More specifically, the steering circuit 38 comprises twelve sets of gates such as a set 510 for the lowest ordered output from the registers 28, 30, and 32 and a set 520 for the highest ordered output from the registers 28, 30, and 32. Each of these sets 510, 520 includes an output NAND gate 514, 524 and three input AND gates 511–513 or 521–523. The gates 511–513 and 521–523 are coupled to the corresponding output signals from the counters 28, 30, and 32 as shown in FIG. 5 and are selectively enabled under the control of the steering signals RA–RC developed by the counter 426.

With the system 10 in the situation described above, the signal RC is at a more positive level at the end of the reading of the second black bar (see FIG. 9) so that one input to each of the gates 511 and 521 and the corresponding gates in the other sets of gates is enabled. The other inputs to these gates are supplied with the signals AC1–AC12 representing the output from the register 28 in which is stored the width of the first black bar in the reverse read start code. The outputs AC-1–AC12 represent true binary output from the ripple counter 28, and the presence of a binary 1 in the first or lowest ordered stage places the signal AC1 at a high level so that the AND gate 511 is fully enabled. This applies a more positive signal to one input of the NAND gate 514 and provides a more negative output M1/. This output signal as well as the remaining signals M2/-M12/ when applied in negative form to the corresponding binary ordered inputs to the full adders 40 and 42 provides a 2s complement of the value standing in the width counter 28.

With the 2s complement of the width values from the selected counter 28, 30, or 32 added to the true values supplied from the counters 34 and 36, the width value is effectively subtracted from the reference values, and the carry outputs fromm the adders 40 and 42 provide signals representing the presence or absence of relations $B$ and $A$, respectively, in accordance with statements 16 and 17 above. For example, if the stored width value is greater than the product reference value stored in the counter 34, thus establishing the existence of relation B as defined in statement 17, the carry is consumed in the full adder 40, and a low level signal CB/ is provided. The signal CB will be at a more positive level indicating the presence of relation $B$.

With regard to relation $A$, when the width value supplied by the steering circuit 38 is less than the quotient reference value stored in the counter 36, thus satisfying statement 16, the full adder 42 provides a more positive carry signal as a signal CA. The signal CA indicates the establishment of relation A as defined by statement 16.

With regard to the specific example in which the start code is read in reverse direction, the narrow width of the first black bar is stored in the counter 28 and is supplied by the steering circuit 38 as the signals M1/–M12/ to the inputs of the adders 40 and 42. This value is compared with the reference values based on the wide width of the second black bar now stored in the reference value counters 34 and 36. Thus, the stored value from the counter 28 representing the width of the first black bar is less than the quotient reference value stored in the counter 36, and the adder 42 provides a more positive signal CA representing the establishment of relation $A$ as defined by statement 16. Further, since the width value stored in the counter 28 is much less than the product reference value based on the second wide black bar stored in the reference counter 34, the signal CB/ is at a more positive level, and the true signal CB is at a low level indicating the absence of relation $B$.

A signal CC is provided which represents the presence of condition C as defined in statement 18 whenever the signal CC is at a high level. This signal is generated by a NOR gate 632, the two inputs to which comprise the signals CA and CB. Thus, if condition $A$ is not present, as represented by a low level CA, and if relation $B$ is not present as represented by a low level CB, the signal CC rises to a high level. The signals CA, CB, and CC representing conditions or relations $A$, $B$, and $C$, respectively, as defined by statements 16 – 18 provide the necessary data for decoding the width modulated code areas and storing the results thereof in the shift register 20.

This decoding takes place during the signal 01 on each transition following the first three transitions when the system 10 is in a search condition and takes place during the last five transitions during the read mode of the system 10. To provide a sampling strobe signal SS, there is provided a NOR gate 448, one input of which is supplied with the signal 01/. The other input to the NOR gate 448 is provided by the output of a NOR gate 446, one input of which is supplied with the signal START/. Accordingly, whenever the system is in a search mode and the signal START/ is at a high level, one input to the NOR gate 448 is held at a low level potential, and the signal 01/ provides a more positive strobing signal SS during each timing signal 01. This signal SS is applied to one input of each of three NAND gates 606, 610, and 612 connected to the prime inputs of the stages 623 and 621 in the shift register 20. The gate 610 coupled with a following NAND gate 614 implements the first term of statement 23. The NAND gate 606 coupled with the following inverter 608 implements the first term of statement 24. Stage 625 (Q5) cannot be primed to a binary 1 condition when the system 10 is in a search mode because of the continuous inhibit applied by the signal START/ through a NOR gate 600.

The shift register stages 621–627 are all in a reset condition at this time because of the recent removal of the reset signal D RES. When the signal SS is generated in the manner described above as the reader 14 enters the second white space in the reverse read start code and with the signal CA at a more positive level at the output of the adder 42 for the reasons set forth above, the gate 610 is fully enabled to provide a more negative output which controls the gate 614 to preset a binary 1 into the input stage 621. When the counter 412 develops the signal 03, the gate 434 and the inverter 442 again develop the signal RRAC to clear the counter 28 from which the width value was just read by the steering circuit 38. The signal 03 also controls the gates 434 and 436 to provide the signal RRCR (see FIG. 9) to clear the product registers 34 and 36.

When the counter 412 advances to provide the more positive signal 05 and on the trailing edge of this signal as defined by the inverted signal 05/, the contents of the shift register 20 are shifted one stage to the right. The binary 1 from the input stage 621 is transferred to the stage 622, a binary 0 is stored in the input stage 621 by virtue of the grounded input to this stage, and binary 0s are stored in the stages 623–627.

At the end of the cycle of operation of the counter 412, the flip-flop 404 is reset and the signal RAD/ rises to a more positive level to advance the counter 426 a single step so that the signal RA becomes more positive (see FIG. 9). The signal RA enables the gate 416 so that the pulse train consisting of the signals GRA starts to accumulate the width of the second space in the reverse read start code in the cleared counter 28, the counter 414 being enabled by the low level signal RAD. This low level signal RAD also enables the counters 500 and 502 so that product and quotient reference values are stored in the counters 34 and 36 based on the width of the second space in the reverse read start code. The more positive signal RA also controls the steering circuit 38 to enable the gates 512 and 522 and the corresponding gates in the other sets so that the 2s complement of the value standing in the counter 30 in which is stored the width of the first space is applied to the inputs of the full adders 40 and 42.

As the reader 14 travels over the width of the second space and enters the third black bar, the flip-flop 406 is set to drop the signal RAD/ to a low level. The signal RAD rises to a high level to terminate the accumulation of the width of the second space in the counter 28 and to terminate the storage of the product and quotient reference values in the registers 34 and 36 based on the width of the second space. The low level signal RAD/ also releases the counter 412 to operate through a cycle of operation.

During the signal 01, the signal SS examines the output signals CA and CB from the full adders 42 and 40, respectively. Since the width of the second space is greater than the width of the first space now stored in the counter 30, the signal CA is more positive and the gates 610 and 614 again preset a binary 1 in the input stage 621. During the signal 03, the signals RRCR and RRBC are generated (see FIG. 9) to clear the registers 30, 34, and 36 now that the results of the comparison operation have been used to store values in the shift register 20. At the end of the signal 05, the contents of the shift register 20 are shifted one step to the right so that binary 1s are stored in the stages 622 and 623, and binary 0s are stored in the stages 621 and 624–627.

At the end of the cycle of the counter 412, the flip-flop 406 is reset, and the signal RAD/ rises to a more positive level to advance the counter 426 a single step so that the signal RB becomes more positive. The signal RB enables the gate 418 to provide the signal GRB for storing the width of the third black bar in the previously cleared counter 30, the signal RAD being at a low level to enable not only the counter 414 but also the counters 500 and 502, and thus the product and quotient values are stored in the just cleared counters 34 and 36 based on the width of the third black bar. The more positive signal RB also controls the gating circuit 38 to partially enable the gates 513 and 523 and the corresponding gates in the remaining sets so that the 2s complement of the value of the width of the second black bar stored in the counter 32 is now supplied to the inputs of the full adders 40 and 42.

During continuing movement of the reader 14 relative to the record 12, the remaining bar and space widths of the reverse read start code and the corresponding product and quotient reference values are stored in the counters 28, 30, 32, 34, and 36, and the output signals from the adders 40, 42 are sampled by the sampling strobe signal SS in the manner described above. At the end of the comparison of the width of the second space to the reference values based on the third space, and after the 05 signal has shifted the contents of the register 20 one step to the right, the stages 621–627 contain 0001100 when considered from left to right in FIG. 6. As the reader 14 leaves the fourth black bar of the reverse read start code and enters the space separating the start code from the first character (FIG. 9), the same operations described above are performed including the operation of the counter 412 through a cycle of operation. When the signal 01 is generated to provide the sampling strobe signal SS, the relation A is established because the third black bar is smaller than the fourth black bar, and the gate 610 is again fully enabled to prime a binary 1 into the input stage 621. Thus, the contents of the register 20 are now, considered from left to right, 1001100. This is a correct start code when read in reverse or backward direction.

During the initial search for a proper start condition, a logic circuit indicated generally as 630 is used to reduce the possibility of detecting an erroneous start condition arising out of the initial movement of the reader 14 and resultant spurious optical signals. As noted above, a proper start code does not result in a relation *C*. Accordingly, the establishment of this condition represented by the more positive signal CC partially enables a NAND gate 634 which is fully enabled during the sampling period defined by the signal 01 only when the system 10 is in the search mode defined by the positive signal START/. The low level output from the enabled gate 634 controls a NAND gate 634 to apply a more positive input to the NOR gate 640. This gate and the inverter 642 reset the third shift register stage 623 to clear any binary 1s stored therein. The same binary 1 clearing function with respect to the third stage 623 is performed by a NAND gate 636 when the relation A is established as represented by the more positive signal CA. This resetting of the third stage 623 does not change the decoding of proper start signals but reduces the chances of improper start code detection.

Detection for a valid start code occurs on timing signal 04 and will thus occur prior to generation of the signal 05 which would shift the valid start code one step to the right in the shift register 20 and thus provide an incorrect start code. More specifically, detection of a valid start code is performed by a gating network or control circuit 650. This network includes three NOR gates 652, 654, and 656, the outputs of which are coupled to two NAND gates 658 and 660. The gates 652 and 654 control the gate 658 when a correct start code read in a forward direction is found. The gates 654 and 656 control a gate 660 when a correct start code read in a backward or reverse direction is detected. The inputs to the gates 652, 654, and 656 are supplied by the true and false outputs of the shift register stages 621–627. More specifically, when the reverse read start code is stored in the stages 621–627, as described above, all of the inputs to the gates 654 and 656 are at a low level, and at least one input to the gate 652 is at a more positive level. Thus, the output of the NOR gate 652 applies an inhibit to the upper input of the gate 658. However, the outputs of both of the gates 654 and 656 are at a high level to fully enable the gate 660, thereby providing a more negative backward start signal STBD/.

The true signal STBD which is now at a positive level is applied to one input of a NAND gate 464, the other input to this gate being supplied by an inverter 460, the input of which is coupled to the output of a NAND gate 458. When the system 10 is in a search condition, the signal START/ is more positive to enable one input to the gate 458 to provide a further control over the rejection of spurious start signals, and since a proper start condition can be established only on leaving a black bar and entering a white space, the high level signal BLACK/ enables a second input to the gate 458. A third input to this gate is supplied by the signal 04. When the signal 04 rises to a more positive level, the gate 458 is fully enabled, and its low level output is effective through the inverter 460 to fully enable the gate 464 so that its output drops to a low level. At the end of the signal 04, the gate 464 is no longer enabled, and its output rises to a high level. This positive-going signal sets the flip-flop 468 to provide a more positive backward signal BWD indicating that a proper start condition read in a reverse direction has been detected. The more positive signal BWD is effective through the NOR gate 470 and the inverter 472 to provide a more positive start signal START (FIG. 9). The presence of the more positive signal START conditions the system 10 for operation in its read mode.

More specifically, the signal START/ is now at a low level and controls the gates 446 and 448 to prevent the continuous generation of the strobing signal SS on each phase one signal 01. The generation of the strobing signal SS is now dependent on the setting of the counter 428. The low level signal START/ also removes the inhibit applied to the gate 600 so that the circuitry for effecting the controlled priming of the fifth stage 625 of the shift register 20 can be effected during the read operation. In addition, the low level signal START/ disables the gates 634 and 636 which form a part of the decoding logic peculiar to detection of start codes as described above.

The low level signal START/ also removes the inhibit or continuous reset from the counter 428 so that this counter is hereafter advanced on each positive-going transition in the signal RAD/. More specifically, since the proper start code was detected on signal 04 generated when the reader 14 enters the space separating characters, when the counter 412 completes a cycle of operation and resets the flip-flop 404, the signal RAD/ rises to a more positive level and advances both of the counters 426 and 428 a single step. The advance of the counter 426 provides a more positive signal RB so that the signal GRB is supplied during the inter-character space for storage in the register 30, this register previously having been cleared on a preceding signal 05. The storage of this value is of no consequence inasmuch as sampling strobes SS are inhibited during comparison operations involving this value stored in the counter 30. The same is true with regard to the reference values stored in the counters 34 and 36.

More specifically, when the counter 428 is advanced a single step, the more positive signal JO is terminated, and a more positive signal J1 is generated (FIG. 9). The signal J1 persists during the inter-character interval defined by the white space separating the last black bar of the start code read in reverse and the first black bar of the first character which will also be read in reverse. The more positive signal J1 is applied to one input of a NOR gate 444 so that one input to the NOR gate 446 is held at a low level potential. Since the signal START/ is also at a low level, the output of the gate 446 rises to a more positive potential and holds the signal SS at a low level, regardless of variations in the level of the signal 01/. The remaining two inputs to the gate 444 are provided by the signals J2 and J3 which become positive in sequence as the reader 14 enters the first black bar in the following character code and the first space bar in the following character code. Since the counter 428 is advanced after the generation of the sampling signal 01, the gate 444 prevents the generation of sampling strobes until the reader 14 leaves the second black bar of the first character and enters the second space. The sampling strobe signal SS can then be generated during the more positive sequential signals J4–J7 and JO defining the last five bit positions in the character read.

FIG. 9 of the drawings illustrates the code of the first character of the message to be read following the receipt of the valid start code read in a backward direction. Since the first character is also read in a backward direction, the character code shown in FIG. 9 is the tenth character code shown in the table above at page 20. This particular character has been chosen for illustration because the sequence of signals or the binary bits is the reverse of the character illustrated in FIG. 3 of the drawings. The character shown in FIG. 3 of the drawings is the third character in the table on page 20 read in a forward direction. Thus, the translation and decoding operations performed by the logic 44 and the shift register 20 in decoding the first character shown in FIG. 9 are the same as those described above with regard to the character shown in FIG. 3 when read in a forward direction.

More specifically, the system 10 during the decoding of the first character of the message illustrated in FIG. 9 operates in the manner described above to provide the phase signals 01–05 on each signal transition to advance the counter 426 on each signal transition, to clear the registers 28, 30, 32, 34, and 36, to steer various width values and reference values into these registers following their clearing, and to advance the counter 428 to generate the signals J1–J0 in sequence. These signals marking bit position are used to control the decoding logic 44 and to sequence certain operations of the system 10.

As an example, the signals J6, J7, and J0 defining the last three bit positions in a character are connected to the input of a NOR gate 455 so that a signal SSO/ drops to a low level during the last three bit positions. This signal is applied to one input of the NOR gate 600 to partially enable this gate which forms a part of the logic for priming the fifth stage 625 during the read operation.

Referring now more specifically to the decoding logic 44, the strobing signal SS now appears only during the signals J4–J7 and J0 defining the five times at which comparison operations are to be made. Thus, the gates 606, 610, and 612 are partially enabled at these times. Accordingly, the gate 610 satisfies the second term of statement 23 for presetting the input stage 621 with a binary 1. The gate 612 satisfies the third term of statement 23 in including as an input the signal FE which is more positive when the third stage 623 (Q3) of the shift register 20 is set. The gate 606 satisfies the second term of statement 24 for presetting the third stage 623 (Q3) of the shift register.

The gates 600 and 602 satisfy the single term of statement 25 for presetting Q5. The signal FE and the signal FE/ applied to the gates 600 and 602, respectively, provide the NOT conditions for Q3 and Q5 (stages 623 and 625, respectively). The signal 01 and CB applied to the gate 602 provide the first two elements in statement 25. The signal SS0/ provides the second parenthetical term in statement 25, and the signal START/ applied to the gate 600 provides the enabling only during a start condition.

Accordingly, as the reader 14 is moved across the bars and spaces of the first character with the proportionate widths shown by the configuration of the signal BLACK in FIG. 9, the same bits of information are stored in the shift register 20 in the same sequence as illustrated in the table in FIG. 9. The storage of width and reference values is controlled by the counters 412, 414, 426, 500, and 502 in the manner described in detail above. The step-by-step operation of the counter 428 marks the bit position currently sensed by the reader 14. Thus, as the reader 14 enters the last black bar of the first character code read in a reverse direction, the counter 428 advances to a setting in which the signal J0 becomes more positive, and as the reader 14 leaves the last black bar and enters the first white space, the counter 412 is operated through its sequence of operation in which the timing signals 01–05 are generated. On the signal 01, the last sampling operation takes place to add a binary 1 to the input stage 621 in the manner shown in the above table and described above. Thus, a complete correct code for the tenth character in the character set is stored in the shift register 20 in reverse direction. During time 03, a parity check is made to determine whether the code is correct.

This parity check is performed by a parity checking network 670 which includes five NAND gates 671–675 for performing an odd, single binary 1 check on the information encoded in bars, and four NAND gates 676–679 for making an odd parity, single binary 1 check on the information encoded in the spaces of the character code. More specifically, the inputs to the gates 671–674 are interconnected with the outputs of the stages 621, 623, 625, and 627 in which are stored the bar encoded information in such a manner that the gates 671–674 satisfy the first four terms in the first bracketed term in statement 22. Similarly, the inputs to the gates 676–678 are interconnected with the outputs of the stages 622, 624, and 626 in which are stored the space encoded information in such a manner as to satisfy the first three terms, respectively, in the second bracketed term of statement 22. In this connection, stages 621–627 correspond to stages Q1–Q7, respectively.

Accordingly, when the bar encoded information includes a single binary 1 and satisfies an odd parity check, one of the gates 671–674 is enabled to control the connected gate 675 to provide a more positive signal to one input of a NAND gate 680 which combines the results of the bar and space parity checks. Similarly, when the space encoded information is correct, one of the gates 676–678 is fully enabled to control the gate 679 to provide a more positive input to the connected input of the gate 680. Thus, when the parity check is satisfactorily performed on both the bar and space encoded information, the gate 680 is fully enabled and provides a more negative signal PARITY/.

Assuming that the parity check was satisfactorily performed and that the signal PARITY/ is at a low level, this signal is applied to one input of a NAND gate 452. The other inputs to this gate are provided by the signals J0 and 03 so that the parity check can be performed only when 03 is generated following the time at which J0 rises to a positive level, i.e., the end of a character, and following the black bar to space transition at the end of the fourth black bar in a character code. Since the signal PARITY/ is at a low level, the parity error output signal PE/ from the output of the gate 452 is held at a high level indicating the absence of parity error or the satisfactory results of the parity checking operation.

Since the decoded character comprises a proper code in the selected 2–7 character set, the contents of the shift register 20 can now be transferred to the output means 46 (FIG. 6). This operation is performed on the signal 04. More specifically, a NAND gate 454 (FIG. 4) is provided having three input signals 04, START, and J0. Accordingly, on the signal 04, following the signal 03 on which the parity error is checked and when the system 10 is in a start condition defined by the high level signal START, the gate 454 provides a more negative signal SRS/. This signal is supplied to the output means 46 (FIG. 6) and effects the transfer in parallel of the contents of the register 20 to the output means 46. The output means 46 also is supplied with the signal BWD indicating that the code stored in the shift register 20 is in a reverse condition. The output means 46 can comprise any number of suitable arrangements such as a display unit or a computer input such as an input for a transaction computer system such as the one shown in U.S. Pat. No. 3,596,256. The circuitry controlled by the signal BWD for inverting the order of the bits received in the shift register 20 can also be of conventional construction such as that shown in the above-identified copending application. Alternatively, the output means can comprise a shift register coupled to the output stage 627 or supplied with the signal FA. With this arrangement, as the bits for one character are shifted into the shift register 20, the bits from the preceding character can be shifted out into the shift register in the output means 46.

Accordingly, at the signal 04 developed by the counter 412 on the transition from the fourth black bar of a character code into the white space separating the character from the first black bar in the next character, the complete character code has been decoded and stored in the register 20, checked for parity error, and transferred to the output means 46. When the counter 412 completes its cycle of operation and resets the flip-flop 406, the signal RAD/ again rises to a high level to advance the counter 428 to a position supplying a more positive signal J1 which is present during the inter-character interval. The positive-going signal RAD/ also advances the counter 426 so that the next width register 28, 30, or 32 is selected to receive the width of the first black bar, these registers and the reference value registers 34 and 36 having previously been cleared.

The system 10 then translates or decodes the remaining character codes in sequence and transfers the decoded contents stored in the shift register 20 into the output means 46 following the performance of the parity check. This continues until such time as the message has been determined to contain a predetermined minimum number of characters, and the terminating code is detected. This terminating code comprises a start code read in a reverse direction, in view of the fact that the message is being read in a reverse direction. If the message is read in a forward direction, the message is terminated by a start code read in a forward direction.

To provide means for counting the number of characters in the message, the control circuit 24 includes a NAND gate 450, one input of which is supplied by the signal 03. The other input is provided by the signal J7. Thus, the gate 450 is fully enabled once during the decoding of each character to provide a more negative signal SOT/. This signal is supplied to the clock or count input terminal CLK of a Johnson counter 644. The counter 644 is normally held in a reset state by the high level signal START/ until the system 10 is placed in a read mode. At this time the level of the signal START/ drops to a low level to remove the continuous reset. Assuming that the counter 644 has a counting capacity of ten, the decoded tenth output from the counter 640 is returned to the enable input terminal E so that the counter 644 is enabled in its reset state.

Successive signals SOT/ each representing a decoded character advance the counter 644 on the positive-going edge of the signal. When ten or the selected number of characters have been counted, the output from the counter 644 rises to a more positive level and enables one input to a NAND gate 646. The other input to this gate is provided with the signal 02. Accordingly, on each signal 02 following the counting of the minimum required number of characters, an output signal 02G/ from the gate 646 goes negative for the duration of the 02 signal. The inverted signal 02G is applied as one input to a pair of NAND gates 484 and 486 which are used to detect a stop condition.

More specifically, in the assumed condition in which the message on the record 12 is being read in reverse direction, when the terminating start code read in a reverse direction is stored in the register 20, all of the inputs to the gates 654 and 656 are again placed at a low level, and the outputs of these gates fully enable the NAND gate 660 so that the signal STBD/ drops to a low level. The inverted signal STBD which is at a positive level provides another input to the gate 486. A further input to this gate provided by the signal BWD is at a more positive level because the record 12 is being read in a reverse direction. Further, the signal J0 is at a more positive level since a complete stop code can be detected only on leaving the fourth black bar in a code and entering the white space following the message. Thus, the gate 486 is enabled to provide a more negative output signal which is applied as one input to a NAND gate 488. The NAND gate 488 and an additional NAND gate 490 provide an end-of-message latch.

The low level signal supplied by the gate 486 to one input of the NAND gate 488 drives the output of this gate to a more positive level. Since this signal is generated during the signal 02, the signal RAD is at a more positive level, and together with the output of the gate 488 completes the enabling of the gate 490 so that its output drops to a low level. The low level output of the gate 490 is returned as a further input to the gate 488 to hold the output of this gate at a more positive level. The more negative output from the gate 490 is also applied to one input of a gate 482. This gate controls the resetting of the forward and backward flip-flops 466 and 468.

More specifically, the low level signal from the output of the gate 490 applied to one input of the NAND gate 482 drives the output of this gate to a more positive level and resets both of the flip-flops 466 and 468. Since the record 12 was read in a reverse direction, the flip-flop 468 is reset to remove the more positive signal BWD. This removes the reversing control signal from the output means 46 and also drops the start signal START to a low level.

The more positive output from the gate 482 also provides the the reset signal RES. This signal is applied to the reset terminal of the flip-flop 616 to reset this flip-flop. When the flip-flop 616 is reset, its Q/output rises to a more positive level and resets the flip-flops 618 and 620. When the flip-flop 620 is reset, the shift register reset signal D RES rises to a more positive level and is effective either directly or through the gates 640 and 642 to reset all of the stages 621–627 in the shift register 20.

The loss of the start signal START places the signal START/ at a high level, and this signal is effective to restore the system 10 to its search mode by reversing the enabling operation previously described. In addition, the high level signal START/ resets the counter 644 to remove the enabling for the gate 646 to prevent further generation of the signal 02G/.

At the conclusion of the cycle of operation of the counter 412 during which the stop code was detected on the signal 02, the flip-flop 406 is reset, and the signal RAD/ rises to a more positive level. This drops the inverted signal RAD to a low level. When the signal RAD drops to a low level, the output of the gate 490 in the end-of-message latch rises to a more positive level and terminates the reset signal RES.

The system 10 is now in condition to interpret the next message on the next record 12. This record interpretation or translation is performed in the manner described above. If, however, the record 12 is read in a forward direction, a proper start condition is detected by the gates 652, 654, and 658 which provide a forward start signal STFD. This signal and the signal provided by the inverter 640 control the gate 462 to set the forward flip-flop 466 to provide the signal FWD. This signal, in turn, provides the start signal START. The gates 652, 654, and 658 also detect the terminating start condition to control the gate 484 to set the end-of-message latch including the gates 488 and 490. In addition, the output means 46 is provided with a low level signal BWD indicating that the message is being read in a forward direction and the contents of the shift register 20 are transferred directly into the output means 46 without inversion in order.

The system 10 also includes means for producing an error indication when certain abnormalities occur during the translation of the record 12. One of these error conditions is the failure of the circuit 670 to detect proper parity conditions in the translated code stored in the shift register 20. As set forth above, the gate 680 provides a low level signal PARITY/ when a correct code is stored in the register 20. However, if either of the NAND gates 675 or 679 representing the results of the parity check on bar encoded information and space encoded information respectively is not supplied with a low level signal from one of the groups of gates 671–674 or 676–678, thus indicating the failure of either the bar parity check or the space parity check, the gate 680 is not fully enabled, and the signal PARITY/ remains at a high level.

Thus, when the gate 452 is enabled by the signals JO and 03 on the transition from the fourth black bar into the white space following a character, the gate 452 is fully enabled, and the parity error signal PE/ drops to a low level. This signal is supplied to one input to a NAND gate 478 to drive the output of this gate to a high level. If the system 10 is in a read condition, the signal START is also at a high level so that a NAND gate 480 is fully enabled to provide a more negative error signal ER/ This more negative signal controls the gate 482 to reset the set one of the flip-flops 466 and 468, thus returning the system 10 to a search condition, and to generate the more positive reset signal RES. Accordingly, the detection of a parity error at any point in the translation of the message on the record 12 immediately resets the system 10 to a search mode.

In addition, the more negative signal ER/ sets an error register comprising a pair of cross-connected NAND gates 474 and 476. The low level signal ER/ applied to one input of the NAND gate 476 drives the output of this gate to a more positive level to provide an error signal ERROR. This signal can be used to control a visible indicator or an audible annunciator. The more positive output from the gate 476 is returned to one input of the gate 474. Since the flip-flops 466 and 468 have both been reset, the output of the NOR gate 470 is also at a more positive level, and the gate 474 is fully enabled to develop a more negative signal ERROR/ which holds the output of the gate 476 at a more positive level when the signal PE/ disappears in the termination of the signal 03. The error latch including the gates 474 and 476 can be reset only upon the subsequent detection of a proper start condition read in either a forward or backward direction so that the output of the gate 470 drops to a low level and thus controls the gate 474 to provide a more positive signal ERROR/.

A further abnormality detected by the system 10 is one in which a bar-space or space-bar transition is not detected by the reader 14 within the limits expected. A result of this condition is that one or more of the registers 28, 30, 32, 34, or 36 will count beyond its counting capacity, thus destroying the validity of the scanned information. So as to detect this condition as quickly as possible, the highest rate value accumulating pulse stream is used. As set forth above, the signal CLKT appears at one-third the clock pulse rate, as contrasted with the one-fifth rate used to store values in the registers 28, 30 and 32 and the one-eighth rate used to store the quotient value in the register 36. Accordingly, the highest ordered stage of the ripple counter 34 in addition to supplying data to the adder 40 supplies a signal FRO which becomes more positive when the counter 34 approaches its counting capacity. This signal is applied to one input of a NAND gate 422.

To prevent the detection of an overflow condition in the space separating characters, i.e., the position defined by the signal J1, the inverted signal J1/ is supplied as the other input to the gate 422 to inhibit this gate during the inter-character interval. However, during all other intervals when the signal FRO becomes positive, the gate 422 is fully enabled to provide a low level signal to the clock input CLK of a flip-flop 424. If the product counter 34 operates through another complete counting cycle after the highest ordered stage has been set to provide the more positive signal FRO, thus indicating that the counting capacity of this register has been exceeded, the highest ordered stage is reset, and the signal FRO drops to a low level. This drives the output of the gate 422 to a more positive level and sets the flip-flop 424 to provide a more negative overflow signal OVFL/. The setting of the flip-flop 424 indicates that an overflow condition has been established in the most rapidly advanced counter 34 and that the data derived from the reader 14 is not valid.

The signal OVFL/ provides one input to the NAND gate 482 and effects the resetting of the set one of the flip-flops 466, 468 as well as the generation of the more positive reset signal RES. This signal restores the system 10 to its search mode and forces the operator to rescan the message on the record 12.

In addition, the signal OVFL/ is applied to one input of the gate 478 and is effective through the gate 480 to develop the error signal ER/. This signal in turn sets the error latch including the gates 474 and 476 to produce the results set forth above. This error latch is reset only upon detection of a subsequent valid start condition.

The overflow flip-flop 424 is reset on the next transition resulting fron rescanning the record when the signal RRCR used to reset the registers 34 and 36 is generated.

A further error detected by the system 10 is a condition in which the reader 14 has, for example, encountered a pencil line or some other mark on the record 14 that is not a valid code and which results in the concurrent setting of the flip-flops 404 and 406. In other words, a proper record will never include transitions between bars and spaces so closely spaced together that both of the flip-flops 404 and 406 are concurrently set. If both of the flip-flops 404 and 406 are concurrently set, both of the pair of signals BCH and WCH become more positive to fully enable the gate 408.

The fully enabled gate 408 provides a more negative underflow error signal UE/. This signal is applied to one input to the gate 478, and this controls the gate 478 and the gates 480 and 482 to both set the error latch including the gates 474 and 476 and to reset the set one of the flip-flops 466, 468 and provide the more positive reset signal RES. The functions performed by these operations are the same as those set forth above. The signal UE/ is returned to a high level by resetting the flip-flops 404, 406 under the control of the counter 412.

Figure 7:
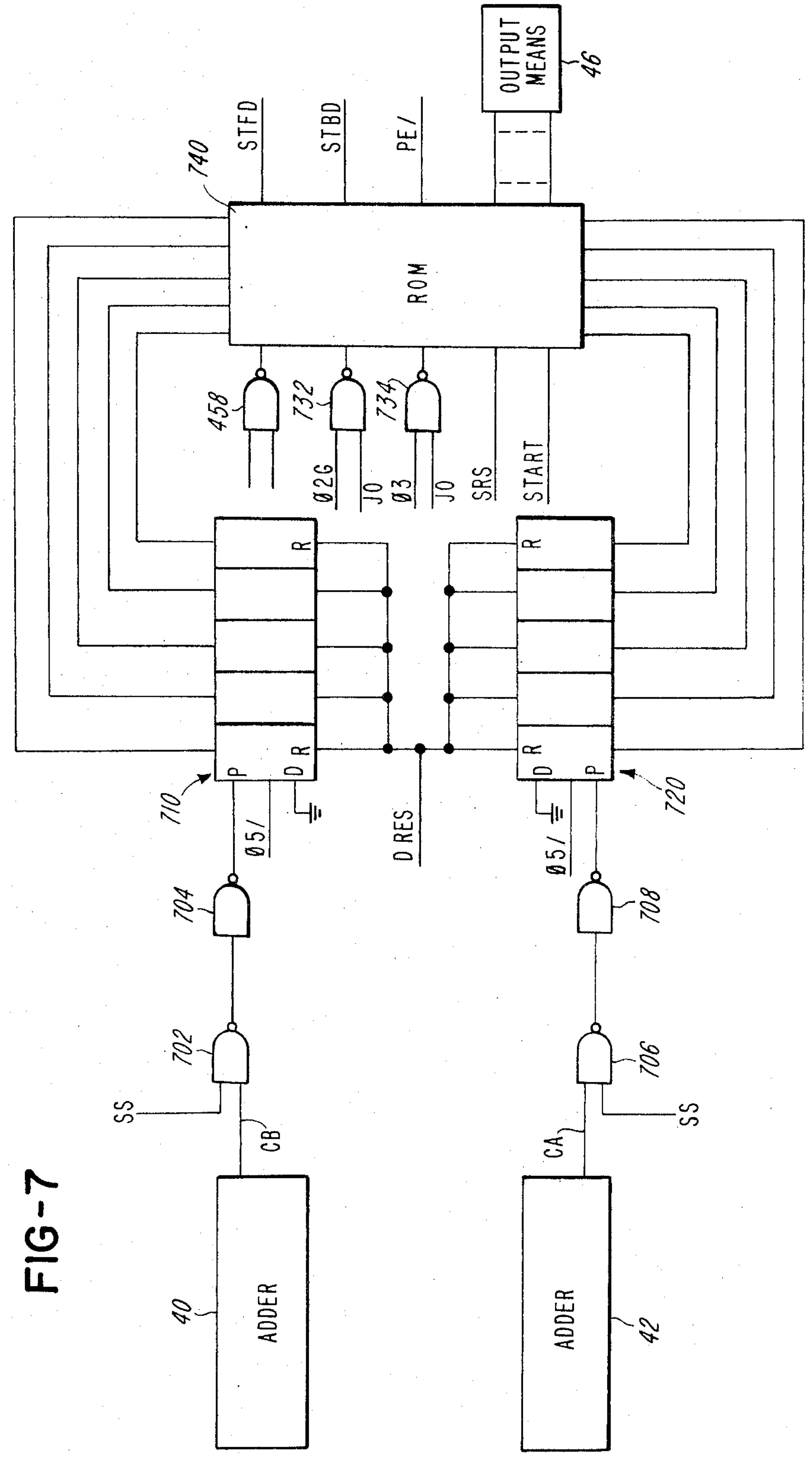
FIG. 7 illustrates in block diagram form another form of decoding circuit useful with the system of FIG. 1.

FIG. 7 of the drawings illustrates a control circuit 700 that can be used in the system 10 in place of the decoding logic 40, the shift register 20, the start detecting network 650, and the parity checking network 670 to perform the functions performed in the system 10 by these components. In general, the control circuit 700 includes a pair of five bit shift registers 710 and 720 individually associated with the adders 40 and 42, respectively. The preset terminal P of the input stage of the shift register 710 is supplied with the output signal CB from the adder 40 through a NAND gate 702 and an inverter 704. The preset terminal P of the input stage of the shift register 720 is supplied with the output signal CA from the adder 42 through a NAND gate 706 and an inverter 708. Both of the shift registers 710 and 720 are reset by the reset signal D RES and are provided with shift pulses by the signal 05/.

The outputs of the five stages in each of the shift registers 710 and 720 are coupled to select inputs of a read-only-memory (ROM) 740. This read only memory 740 is of conventional construction and in essence comprises a plurality of gates with prewired logic for implementing the start and stop decoding functions, the parity checking functions, and the character translation function. Accordingly, the unit 740 includes as outputs the start forward signal STFD, the start backward signal STBD, the parity error signal PE/, and a group of leads for presenting a translated character to the output means 46, as in BCD form. The unit 740 also includes as an input signal the signal START which advises the unit 740 whether the system 10 is in a search or read mode. In general, the signal START selectively enables and inhibits translating gates for carrying out decoding functions comparable to those performed by the circuit 630 which are peculiar to the detection of a start code.

When the reader 14 has passed over the record 12 incident to the beginning of the reading of a message on the record 12 and with the system 10 in a search mode, the various bar and space widths are stored in the registers 28, 30, and 32 and selectively compared with reference values stored in the registers 34 and 36 in the manner described above so as to provide the signals CV and CA representing relationships *B* and *A*, respectively. These two signals are supplied to the inputs of the gates 702 and 706 which are also supplied with the strobing signal SS. As set forth above, the signal SS appears on each bar-space or space-bar transition when the system 10 is in the search mode. Accordingly, the results of each comparison operation are forwarded through the gates 702, 704, 706, and 708 to the preset terminals P of the input stages of the registers 710 and 720. Thus, the input stage to the shift register 710 is primed to a binary 1 condition whenever a relation *B* exists, and the input stage of the shift register 720 is primed to a binary 1 condition whenever a relation A exists. With the D terminals of these input stages strapped to ground, the shift signal provided by the signal 05/ enters a 0 whenever the input stages are not primed under the control of the signals CB or CA. Thus, a binary 0 in corresponding stages of the shift registers 710 and 720 represents the equality condition or relation *C*.

Accordingly, with the system 10 in the search mode, the two shift registers 710 and 720 are loaded with a pattern of binary "0"s and binary "1"s corresponding to the pattern of relations A, B, and C established under the control of the output from the adders 40 and 42. Further, the unit 740 is supplied with the output of the gate 458 in the system 10 to interrogate the unit 740 on each code area transition so that the contents of the registers 710 and 720 are continuously monitored for a start condition, either a start code read in a forward direction or a start code read in a reverse direction. When a proper start condition is detected, a more positive signal STFD or STBD representing a start read in a forward direction or a start read in a backward direction is supplied by the unit 740 and returned to the system 10 to produce the same functions described above.

More specifically, these signals place the system 10 in a read condition, and the signal START applied to the memory 740 rises to a high level to remove the decoding logic peculiar to detection of a proper start condition. Further, the gate 458 is inhibited as described above to prevent interrogation of the memory 740 during the time defined by the signal 04 on each code area transition. As noted above, this logic is used only in the detection of the initial start condition and not the terminating start code so as to avoid errors resulting from the initial or relative movement between the record 12 and the reader 14.

As the reader 14 moves relative to the record 12, the conditions or relations A and B determined by the bars and spaces of the first character code are again supplied by the adders 40 and 42 in the manner described above and are supplied to the preset terminals P of the input stages of the shift registers 710 and 720 under the control of the strobing signal SS which forms an input to each of the gates 702 and 706. As set forth above, the strobing signal SS appears only five times during the bit positions defined by the signals J4–J7 and JO. Thus, only five bits are shifted into the shift registers 710 and 720 during character translation. At the time defined by the signals 03 and JO, i.e., following the reading of the fourth black bar in a character code, a gate 734 is enabled to control the unit 740 to interrogate the stages of the shift registers 710 and 720 for the purpose of performing a parity check. The parity check gates which can implement the logic functions defined in statement (22) selectively provide a high or low level output signal PE/ in dependence on the results of the parity check. If the parity check is not satisfactorily completed, the system 10 is placed in an alarm condition in the manner described above.

If, on the other hand, the parity check is satisfactorily completed, the signal SRS developed by the gate 454 during the timing interval defined by the signal 04 is next applied to the unit 740 so that the contents of the shift registers 710 and 720 are examined and decoded into, for example, BCD signals which are supplied in parallel to the output means 46.

This operation continues in the manner described above until a minimum number of characters has been received, as defined by position of the counter 644. When a minimum number of characters has been received, the signal 02G/ is generated in the manner described above, and the inverted signal 02G is applied to one input of a NAND gate 732. The other input to this gate is provided by the signal JO. Accordingly, at the end of each complete character following the receipt of the minimum number of characters, the gate 732 becomes fully enabled during the time defined by the signal 02 to control the memory unit 740 to interrogate the contents of the shift registers 710 and 720 for a valid stop code, i.e., the terminating stop code read in either a forward or a reverse direction. Whenever such a condition is determined by the memory 740, the proper one of the signals STFD or STBD is supplied, and the system 10 is reset to a search mode in the manner described above.

Although the present invention has been described with reference to a number of illustrative embodiments thereof, it should be understood that numerous other modifications and embodiments can be devised by those skilled in the art that will fall within the spirit and scope of the principles of this invention.

What is claimed and desired to be secured by Letters Patent of the United States is:

1. A method of interpreting a record having a sequence of code areas of different sizes representing code elements of different significance using a record reader, which method comprises the steps of sequentially scanning the code areas with the reader, sequentially establishing the relative sizes of different pairs of code areas in dependence on the sequence in which the code areas are scanned by the reader, assigning a code significance to the various code areas in dependence on the established relative sizes when one of each pair of code areas is greater or less than the other in size, deferring the assignment of code significance when the two code areas of a pair are of similar size, and assigning a code significance to the code areas for which assignment has been deferred in dependence on the code significance assigned to another scanned code area.

2. The method set forth in claim 1 including the further step of establishing the code significance to be assigned to the code areas for which assignment has been deferred in dependence on the code significance assigned to a subsequently scanned code area.

3. The method set forth in claim 1 including the further step of establishing the code significance to be assigned to the code areas for which assignment has been deferred in dependence on the code significance assigned to a previously scanned code area.

4. A system for interpreting a record encoded with a sequence of code areas of different sizes representing different code values which comprises a reader responsive to the code areas for sensing the code areas on the record, at least a pair of storage means controlled by the reader for storing first values representing the sizes of different code areas in sequence, a pair of register means for individually storing in sequence values greater than and less than the values of the sizes of different code areas, comparing means coupled to and controlled by the pair of register means and the storage means for successively comparing the different values stored in the pair of register means with the values stored in different ones of the storage means, and means coupled to and controlled by the comparing means for determining the code values of the code areas.

5. The system set forth in claim 4 in which the pair of register means includes counting circuits, and the system includes both a clock signal source and clock signal dividing circuits coupled to said counting circuits and controlled by the reader for storing the values in the pair of register means.

6. A system for interpreting a record encoded with a sequence of code areas of different sizes representing different code values which comprises a reader responsive to the code areas for sensing the code areas on the record, a plurality of storage means each adapted to store a first value representing the size of one of the code areas, first gating means between the reader and the storage means for storing values representing the sizes of different code areas in different ones of the storage means, a first register for storing a second value less than the size of a code area, a second register for storing a third value greater than the size of a code area, first control circuit means controlled by the reader for storing the second and third values in the first and second registers representing the different code areas, comparing means for determining the relation of the first value to the second and third values and coupled to the first and second registers, second gating means between the plurality of storage means and the comparing means for supplying first values in sequence to the comparing means, and second control circuit means controlled by the comparing means for assigning code values to the code areas.

7. The system set forth in claim 6 in which the code areas in said sequence are of at least two different characteristics, and the comparing means compares first, second, and third values derived from areas of like characteristics.

8. The system set forth in claim 6 in which the first control means includes means for storing second and third values in the first and second registers corresponding to the code area sensed by the reader, the first gating means includes means for concurrently storing a first value in one of the storage means corresponding to the code area sensed by the reader, and the second gating means includes means for supplying a first value to the comparing means corresponding to a code area previously sensed by the reader.

9. The system set forth in claim 6 in which the second gating means includes means for selecting a first value corresponding to a previously sensed code area that is spaced at least one code area in said sequence from the code area represented by the second and third values in the first and second registers.

10. A system for interpreting a record encoded with a series of areas of different sizes representing different code values which comprises record reading means responsive to the code areas, size evaluating means controlled by the record reading means for determining whether the relative size or status of a given code area relative to another code area is a greater than status, a less than status, or an equality status, storage means for storing code values, first logic circuit means controlled by the size evaluating means for storing a corresponding code value in the storage means representing said given area only when the size evaluating means determines that a greater than or less than status exists, and second logic circuit means for thereafter storing in said storage means proper code values for those code areas previously determined to have an equality status.

11. A system for interpreting a record encoded with a series of areas of different sizes representing different code values which comprises an area responsive reader, size evaluating means coupled to and controlled by the reader for sequentially determining the size relationship status between a given code area and another code area as being a greater than status, a less than status, or an equality status, storage means for storing code values, first logic circuit means controlled by the size evaluating means for entering code values into the storage means for the code areas having a greater than and a less than status, and second logic circuit means controlled by the first logic circuit means for storing code values in the storage means for those code areas having an equality status.

12. The system set forth in claim 11 in which the second logic circuit means is coupled to the storage means and controlled by code values stored therein.

13. The system set forth in claim 11 in which the second logic circuit means includes means controlled by the code value entered into the storage means by the first logic circuit means for a given code area for controlling the code value stored in the storage means for another code area having an equality status.

14. A system for interpreting a record encoded with a series of areas of different sizes representing different code values which comprises an area responsive reader, size evaluating means coupled to and controlled by the reader for sequentially determining the size relationship status between a given code area and another code area as being a greater than status, a less than status, or an equality status, a shift register with a plurality of stages through which data moves from an input to an output, first logic circuit means coupled to and controlled by the size evaluating means for entering different code values in sequence into the shift register representing different code areas and determined by the greater than status or less than status of these code areas, and second logic circuit means for entering code values into the shift register for those code areas having an equality status and including means for entering code values at stages intermediate the shift register input and output.

15. A system for interpreting a record encoded with a series of areas of different sizes representing different code values which comprises, an area responsive reader, size evaluating means coupled to and controlled by the reader for sequentially determining the size relationship status between a given code area and another code area as being a greater than status, a less than status, or an equality status, a shift register having a plurality of stages intermediate a shift register input stage and a shift register output stage, an advance signal source coupled to the shift register for advancing data from the input stage through the intermediate stages of the shift register, and logic circuit means coupled to the shift register for controlling the immediate entry of a code value into the shift register representing a code area when the status of the code area is determined to be greater than or less than and for delaying the entry of a code value into the shift register at least one advance of the shift register when the status of a code area is determined to be equality.

16. A system for interpreting a record encoded with a series of areas of different sizes representing different code values which comprises an area responsive reader, size evaluating means coupled to and controlled by the reader for sequentially determining the size relationship status between a given code area and another code area as being a greater than status, a less than status, or an equality status, a shift register having a plurality of stages intermediate a shift register input stage and a shift register output stage, an advance signal source coupled to the shift register for advancing data from the input stage through the intermediate stages of the shift register, means for entering a given code value in the input stage of the shift register on each advance signal, and logic circuit means controlled by the size evaluating means and coupled to the input stage of the shift register and at least one intermediate stage for changing said given code value to another code value.

17. The system set forth in claim 16 in which the logic circuit means immediately controls the entry of a code value into the shift register when the status of a code area is determined to be less than or greater than and includes means to delay entry of the code value for at least one advance of the shift register when the status of a code area is determined to be equality.

18. A method of interpreting a record encoded with code areas of different sizes with a record reader which comprises the steps of sequentially sensing different code areas with the record reader including first and second code areas which are separated by at least one other code area intermediate said first and second code areas, establishing a first value in dependence upon the size of said first code area, establishing a second value in dependence upon the product of a constant greater than one and the size of said second code area, establishing a third value in dependence upon the quotient of a constant greater than one and the size of the said second code area, and determining the relation of the first value to the second and third values as an indication of the code significance of the given code area.

19. A system for interpreting a record encoded with a series of areas of different sizes groups of which areas represent different code values, said system comprising an area-responsive reader, size evaluating means coupled to and controlled by the reader for sequentially determining the relative size — greater-than, less-than, or equal — of selected code areas in each group with respect to other selected code areas in the same group and for sequentially providing a corresponding sequence of greater-than, less-than, and equality signals for each group, and decoding means coupled to the size evaluating means and controlled by said greater-than, less-than, and equality signals for presenting the code values corresponding to each group of areas, said decoding means including register means for storing representations of the greater-than, less-than, and equality signal sequences for each group and also including signal decoding means coupled to said register for decoding the representations within said register means and for presenting the decoded representations as the code values.

20. The system set forth in claim 19 in which the register means includes one register storing representations of greater than signals and another register storing representations of less than signals.

* * * * *

Disclaimer 3,784,792.—*Bruce W. Dobras*, Dayton, Ohio. CODED RECORD AND METHODS OF AND APPARATUS FOR ENCODING AND DECODING RECORDS. Patent dated Jan. 8, 1974. Disclaimer filed Apr. 4, 1974, by the assignee, *Monarch Marking Systems, Incorporated*.

Hereby enters this disclaimer to claims 1 through 3 of said patent.

[*Official Gazette August 13, 1974.*]